United States Patent
DiVerdi et al.

(10) Patent No.: US 10,803,642 B2
(45) Date of Patent: Oct. 13, 2020

(54) COLLABORATIVE VIRTUAL REALITY ANTI-NAUSEA AND VIDEO STREAMING TECHNIQUES

(71) Applicant: Adobe Inc., San Jose, CA (US)

(72) Inventors: Stephen Joseph DiVerdi, Oakland, CA (US); Aaron Phillip Hertzmann, San Francisco, CA (US); Brian David Williams, San Jose, CA (US)

(73) Assignee: Adobe Inc., San Jose, CA (US)

(*) Notice: Subject to any disclaimer, the term of this patent is extended or adjusted under 35 U.S.C. 154(b) by 0 days.

(21) Appl. No.: 15/680,523

(22) Filed: Aug. 18, 2017

(65) Prior Publication Data
US 2019/0057529 A1   Feb. 21, 2019

(51) Int. Cl.
| | |
|---|---|
| G06T 11/60 | (2006.01) |
| G06F 3/01 | (2006.01) |
| H04L 29/06 | (2006.01) |
| G06F 3/0346 | (2013.01) |
| G06T 19/00 | (2011.01) |

(52) U.S. Cl.
CPC ............. *G06T 11/60* (2013.01); *G06F 3/011* (2013.01); *G06F 3/012* (2013.01); *G06F 3/013* (2013.01); *G06F 3/0346* (2013.01); *G06T 19/006* (2013.01); *H04L 65/403* (2013.01); *H04L 65/60* (2013.01); *H04L 65/605* (2013.01); *H04L 67/38* (2013.01); *G06T 2200/24* (2013.01)

(58) Field of Classification Search
CPC ... G06T 11/60; G06T 19/006; G06T 2200/24; G06F 3/012; H04L 65/403; H04L 65/60; H04L 65/605; H04L 67/38
See application file for complete search history.

(56) References Cited

U.S. PATENT DOCUMENTS

| | | | |
|---|---|---|---|
| 5,742,264 A | 4/1998 | Inagaki et al. | |
| 8,914,472 B1 * | 12/2014 | Lee ................... | H04L 29/06476 709/219 |

(Continued)

FOREIGN PATENT DOCUMENTS

| | | |
|---|---|---|
| EP | 3057089 | 8/2016 |
| EP | 3166319 | 5/2017 |

OTHER PUBLICATIONS

"Combined Search and Examination Report", GB Application No. 1809912.7, dated Dec. 19, 2018, 7 pages.

(Continued)

*Primary Examiner* — Abderrahim Merouan
(74) *Attorney, Agent, or Firm* — SBMC

(57) ABSTRACT

Techniques and systems to support collaborative interaction as part of virtual reality video are described. In one example, a viewport is generated such that a reviewing user of a reviewing user device may view VR video viewed by a source user of a source user device. The viewport, for instance, may be configured as a border at least partially surrounding a portion of the VR video output by the reviewing VR device. In another instance, the viewport is configured to support output of thumbnails within an output of VR video by the reviewing VR device. Techniques and systems are also described to support communication of annotations between the source and reviewing VR devices. Techniques and systems are also described to support efficient distribution of VR video within a context of a content editing application.

20 Claims, 20 Drawing Sheets

(56) References Cited

U.S. PATENT DOCUMENTS

| | | | |
|---|---|---|---|
| 10,613,703 | B2 | 4/2020 | DiVerdi et al. |
| 2002/0044152 | A1* | 4/2002 | Abbott, III ............... G06T 11/00 345/629 |
| 2009/0293012 | A1 | 11/2009 | Alter et al. |
| 2012/0105483 | A1* | 5/2012 | Fedorovskaya ...... G02B 27/017 345/660 |
| 2012/0249741 | A1* | 10/2012 | Maciocci ................. G06F 3/011 348/46 |
| 2012/0295708 | A1* | 11/2012 | Hernandez-Abrego ..................... G06F 3/167 463/36 |
| 2013/0293447 | A1* | 11/2013 | Bickerstaff .......... G02B 27/646 345/8 |
| 2014/0214629 | A1* | 7/2014 | Azam ................. G06Q 30/0643 705/27.2 |
| 2014/0223462 | A1* | 8/2014 | Aimone .................. G16H 40/67 725/10 |
| 2014/0268356 | A1* | 9/2014 | Bolas ................. G02B 27/0093 359/630 |
| 2014/0320529 | A1 | 10/2014 | Roberts et al. |
| 2014/0361977 | A1* | 12/2014 | Stafford .................. G06F 3/013 345/156 |
| 2015/0271401 | A1 | 9/2015 | Khoury |
| 2016/0035136 | A1 | 2/2016 | Sendai et al. |
| 2016/0055676 | A1 | 2/2016 | Kasahara et al. |
| 2016/0212375 | A1* | 7/2016 | Reitel ..................... H04N 7/147 |
| 2016/0328114 | A1 | 11/2016 | Santhakumar et al. |
| 2016/0358383 | A1* | 12/2016 | Gauglitz ............... G06T 19/006 |
| 2017/0132845 | A1* | 5/2017 | Everman, II .......... G06T 19/006 |
| 2017/0336861 | A1 | 11/2017 | Fateh |
| 2018/0271401 | A1 | 9/2018 | Greene et al. |
| 2019/0056848 | A1 | 2/2019 | DiVerdi et al. |

OTHER PUBLICATIONS

"Combined Search and Examination Report", GB Application No. 1809951.5, dated Dec. 18, 2018, 9 pages.

Corbillon,"Viewport-Adaptive Navigable 360-Degree Video Delivery", Sep. 26, 2016, 8 pages.

"cineSync 2005", Retrieved at: https://cospective.com/cinesync/—on Aug. 10, 2017, 8 pages.

"Facebook Social VR Demo—Oculus Connect 2016—YouTube Video", Retrieved at: https://www.youtube.com/watch?v=YulgyKLPt3s, Oct. 6, 2016, 4 pages.

"Look at Review and Collaboration", Retrieved at: https://www.lookat.io/—on Aug. 10, 2017, 7 pages.

"VidCrit: Video-Based Asynchronous Video Review—YouTube Video", Retrieved at: https://www.youtube.com/watch?v=Pp-jDTbzi_4, Sep. 6, 2016, 2 pages.

Anne,"The HOA library, review and prospects", In International Computer Music Conference | Sound and Music, Sep. 2014, 6 pages.

Baker,"Media Production: Towards Creative Collaboration Using Communication Networks", Computer Supported Cooperative Work 8, 1999., Dec. 1999, 2 pages.

Bala,"IVRUX: A Tool for Analyzing Immersive Narratives in Virtual Reality", Lecture Notes in Computer Science, vol. 5334, Jul. 2016, 9 pages.

Benford,"Collaborative Virtual Environments", Communications of the ACM Jul. 2001/vol. 44, No. 7, Jul. 2001, 7 pages.

Bruder,"Tuning Self-Motion Perception in Virtual Reality with Visual Illusions", IEEE Transactions on Visualization and Computer Graphics 18, 7, Jul. 2012, 13 pages.

Cherubini,"Deixis and Gaze in Collaborative Work at a Distance (over a shared map): a Computational Model to Detect Misunderstandings", In Proceedings of the Symposium on Eye Tracking Research and Applications, Jan. 2008, 10 pages.

Cordell,"Immersive Collaborative Analysis of Network Connectivity: CAVE-style or Head-Mounted Display?", IEEE Transactions on Visualization and Computer Graphics, vol. 23, Issue: 1, Jan. 2017, 10 pages.

Dourish,"Awareness and Coordination in Shared Workspaces", In Proceedings of the ACM Conference on Computer-supported cooperative work, Dec. 1992, 9 pages.

Fernandes,"Combating VR Sickness through Subtle Dynamic Field-Of-View Modification", In Proceedings of the IEEE Symposium on 3D User Interfaces, Mar. 2016, 10 pages.

Fraser,"Supporting Awareness and Interaction through Collaborative Virtual Interfaces", In Proceedings of the ACM Symposium on User Interface Software and Technology, Nov. 1999, 10 pages.

Gugenheimer,"Share VR: Enabling Co-Located Experiences for Virtual Reality Between HMD and Non-HMD Users", In Proceedings of the 2017 CHI Conference on Human Factors in Computing, May 2017, 13 pages.

Gutwin,"Design for Individuals, Design for Groups: Tradeoffs Between Power and Workspace Awareness", Proceedings of the ACM Conference on Computer Supported Cooperative Work, Nov. 1998, 10 pages.

Han,"CU-SeeMe VR Immersive Desktop Teleconferencing", In Proceedings of the ACM International Conference on Multimedia, Nov. 1996, 9 pages.

Heer,"Design considerations for collaborative visual analytics", Feb. 21, 2008, 14 pages.

Henrikson,"Multi-Device Storyboards for Cinematic Narratives in VR", Proceedings of the ACM Symposium on User interface software and technology, Oct. 2016, 10 pages.

Henrikson,"Storeoboard: Sketching Stereoscopic Storyboards", Proceedings of the SIGCHI conference on Human factors in computing systems, May 2016, 12 pages.

Kolasinski,"Simulator sickness in virtual environments", Technical Report, May 1995, 68 pages.

Krum,"Spatial Misregistration of Virtual Human Audio: Implications of the Precedence Effect", Proceedings of the SIGCHI Conference on Human Factors in Computing Systems, Mar. 2001, 2 pages.

Li,"Facial Performance Sensing Head-Mounted Display", ACM Transactions on Graphics (Proceedings of SIGGRAPH), Jul. 2015, 9 pages.

Lowe,"Visualization and Analysis of Head Movement and Gaze Data for Immersive Video in Head-mounted Displays", Proceedings of the Workshop on Eye Tracking and Visualization 1, Oct. 2015, 5 pages.

MacQuarrie,"Cinematic Virtual Reality: Evaluating the Effect of Display Type on the Viewing Experience for Panoramic Video", In 2017 IEEE Virtual Reality, Jun. 2017, 10 pages.

Malleson,"Rapid One-Shot Acquisition of Dynamic VR Avatars", In 2017 IEEE Virtual Reality (VR)., Apr. 2017, 10 pages.

McGill,"Examining The Role Of Smart TVs And VR HMDs In Synchronous At-A-Distance Media Consumption", ACM Transactions on Computer-Human Interaction 23, 5, Nov. 2016, 64 pages.

Morris,"SearchTogether: An Interface for Collaborative Web Search", In Proceedings of the ACM symposium on User interface software and technology., Oct. 2007, 10 pages.

Nguyen,"Vremiere: In-Headset Virtual Reality Video Editing", In Proceedings of the 2017 CHI Conference on Human Factors in Computing Systems., May 2017, 11 pages.

Panagiotakis,"A Speech/Music Discriminator Based on RMS and Zero-Crossings", IEEE Transactions on Multimedia 7, 1, Feb. 2005, 12 pages.

Pavel,"VidCrit: Video-Based Asynchronous Video Review", In Proceedings of the Symposium on User interface software and technology., Oct. 2016, 12 pages.

Phalip,"Supporting Remote Creative Collaboration in Film Scoring", In Proceeding of the ACM conference on Creativity and cognition, Oct. 2009, 10 pages.

Snowdon,"Collaborative Virtual Environments: Digital Spaces and Places for CSCW: An Introduction", Collaborative Virtual Environments, Jan. 2001, 34 pages.

Tang,"Watching 360° Videos Together", In Proceedings of the 2017 CHI Conference on Human Factors in Computing Systems., May 2017, 6 pages.

Wallace,"Investigating the Role of a Large, Shared Display in Multi-Display Environments", Computer Supported Cooperative Work 20, 6, Dec. 2011, 33 pages.

(56) References Cited

OTHER PUBLICATIONS

Xiao,"Augmenting the Field-of-View of Head-Mounted Displays with Sparse Peripheral Displays", In Proceedings of the SIGCHI conference on Human factors in computing systems., May 2016, 12 pages.
Yoon,"RichReview: Blending Ink, Speech, and Gesture to Support Collaborative Document Review", In Proceedings of the ACM symposium on User interface software and technology., Oct. 2015, 10 pages.
"Pre-Interview First Office Action", U.S. Appl. No. 15/680,528, dated May 29, 2019, 5 pages.
"Final Office Action", U.S. Appl. No. 15/680,528, dated Sep. 18, 2019, 29 pages.
"Corrected Notice of Allowability", U.S. Appl. No. 15/680,528, dated Mar. 5, 2020, 2 pages.
"Final Office Action", U.S. Appl. No. 15/680,528, dated Jan. 29, 2020, 9 pages.
"Foreign Office Action", GB Application No. 1809951.5, dated Apr. 22, 2020, 5 pages.

* cited by examiner

COLLABORATIVE VIRTUAL REALITY ANTI-NAUSEA AND VIDEO STREAMING TECHNIQUES

BACKGROUND

Virtual reality (VR) video has recently emerged as a creative art form to expand an ability of a user to interact with video, such as to look at different portions of a virtual reality scene output through rendering of the VR video. The expanded abilities usable to interact with VR video, however, limits an ability of users to otherwise interact with each other. Thus, the advantages of VR video in expanded user interaction with the VR video may limit and interfere with other interactions by the user "outside" of this view, such as to communicate with other users.

As part of the process to create VR video, for instance, creative professionals wish to engage in a collaborative review to exchange feedback, e.g., to specify inclusion and modification of particular objects, dialog, and so forth. However, conventional techniques used to support collaborative review and feedback employed for conventional two-dimensional video face numerous challenges and thus are unsuitable for use with VR video. This is because the expanded techniques used to interact with VR video itself limit an ability of users to interact otherwise with each other "outside" of a view of the VR video, even when in the same room. The users, for instance, may wear corresponding head-mounted VR devices to view VR video. As a result, these users are each limited to respective isolated views of the VR video that may differ and are not easily shared with each other.

In one conventional collaboration example used to address this isolation, multiple VR devices share a single view of VR video that is controlled by one of the VR devices. This shared view, however, typically causes nausea to the VR devices that do not control this view and thus is typically avoided for use in collaborative review and feedback of VR video. For example, a source user may control navigation with respect to a VR video through head movement detected by a respective source VR device. This VR video, when viewed by other users of other VR devices, however, may cause nausea. This is because the output of the VR video does not follow head movement of these other users, but rather is controlled by the source user. Thus, this conventional example limits an amount of time the other users can view an output of the VR video as controlled by the source user without feeling sick. Consequently, VR video presents numerous challenges not encountered as part of collaborative review of other types of digital content, such as two-dimensional video.

Further conventional techniques and systems used to share the VR video typically involve loading the VR video onto storage directly accessible to the VR device or uploading the VR video to a remote database that is accessible to the VR device via the Internet. These conventional techniques and systems, for instance, may involve posting to the remote database, which may make it difficult to remain private. Conventional techniques and systems that support local storage require downloading the video and then opening a player application, which may also require manual entry of a uniform resource locator (URL) and thus is frustrating and prone to error. Further, these conventional techniques are modal and thus require users to navigate away from a user interface used to create and edit the VR video to share this content with other devices, which is also frustrating and inefficient.

SUMMARY

Techniques and systems to support collaborative interaction as part of virtual reality video are described. In one example, a viewport is generated such that a reviewing user of a reviewing user device may determine a portion of a VR video viewed by a source user of a source user device. The viewport is also configured to protect against nausea encountered as part of conventional sharing techniques.

The viewport, for instance, may be configured as a border at least partially surrounding a portion of the VR video output by the reviewing VR device. This border is used to identify which portion of the VR video is also output by the source VR device. Further, navigation is controlled by the reviewing VR device with respect to VR video output by that device, such as to look at different portions via head movement The location of the viewport, however, is controlled by the source VR device. As a result, the viewport protects against nausea encountered by conventional VR video sharing techniques because the movement between different portions of the VR video follows head movement detected by the reviewing VR device.

In another instance, the viewport is configured to support output of thumbnails within an output of VR video by the reviewing VR device. The thumbnails correspond to VR video as output by the source VR device. Like the example above, navigation with respect to the VR video outside of the viewport is still controlled by the reviewing VR device, and thus protects against nausea. Additionally, in this example output of the thumbnails of the VR video within the viewport may be performed asynchronously with respect to time in an output of the VR video output outside of the viewport, i.e., to display different portions of different frames. Options may also be included to synchronize time or portions of the VR video being output by the reviewing and source VR device to each other.

Techniques and systems are also described to support communication of annotations between the source and reviewing VR devices. The annotations, for instance, may include passive feedback collected automatically and without user intervention by the source VR device (e.g., detected laughter) or active feedback collected through manual interaction of the user. The annotations as active feedback, for instance, may include freeform lines, spoken utterances, text, and so forth.

These annotations, whether passive or active, are associated with an orientation with respect to a portion of the VR video (e.g., using coordinates of a 2D equirectangular projection of a sphere) and a timestamp indicative of a frame. Orientation data, timestamp, and annotation data that describes this association are communicated as part of collaboration data to the reviewing VR device. The reviewing VR device then controls generation and output of the annotation based on this data.

Techniques and systems are also described to support efficient distribution of VR video within a context of a content editing application. A content editing application, for instance, may support functionality to distribute VR video within a context of the application and receive comments (e.g., reviews) as a result of this sharing, which are then output in a user interface of the content editing application. In this way, the user may remain within a context of the content editing application and share and receive comments in a non-modal manner A variety of other examples are also contemplated, which are described in greater detail in corresponding sections.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of at least one entity and thus reference may be made interchangeably to single or plural forms of the entities in the discussion.

DETAILED DESCRIPTION

Overview

Figure 1:
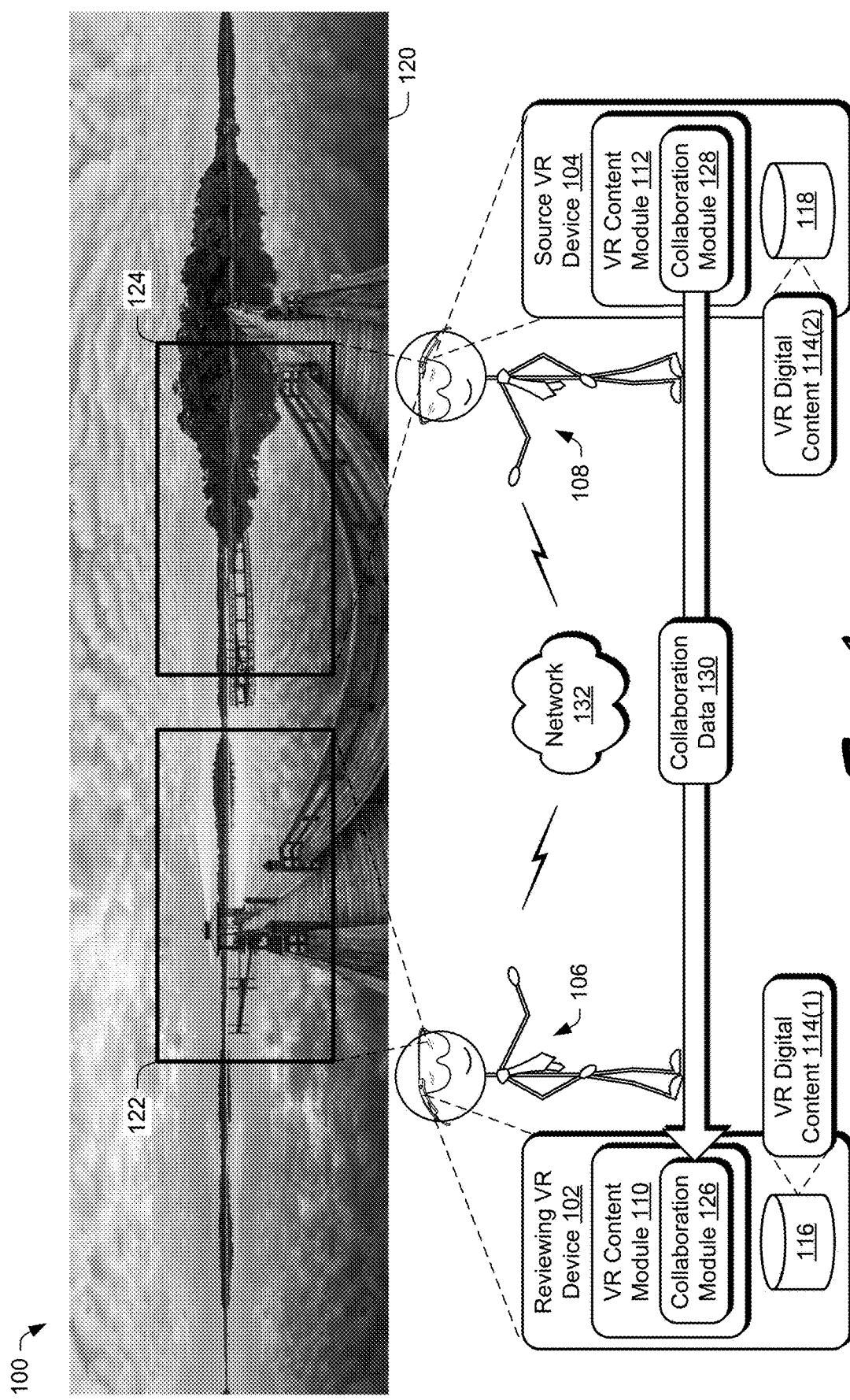
FIG. 1 depicts a system in an example implementation that is operable to employ techniques for collaborative interaction regarding output of virtual reality video as described herein.

Virtual reality (VR) video expands an ability of a user to interact with video over conventional two-dimensional video, such as to look at different portions of a virtual reality scene output through rendering of the VR video. However, as previously described these expanded abilities usable to interact with VR video limit an ability of users to interact otherwise with each other, even when in the same room. Further, conventional techniques to support shared output of VR video by multiple VR devices may cause nausea and thus are typically avoided. Thus, VR video presents numerous challenges not encountered as part of collaborative review of two-dimensional video or other types of digital content.

VR video, for instance, may be configured for output using a VR device configured as a headset (e.g., an immersive head-mounted display) that blocks all view of the outside world. Thus, while providing an immersive view of the VR video, this interferes and prevents almost every type of collaboration between users that wear these devices. This is because there are few affordances made available via conventional systems for awareness of the actions of other users within the output of the VR video. Two users of different VR devices, for instance, cannot easily point to a specific element in a VR video because each user is confined within and isolated to a view of the VR video by a respective VR device. Even if the two users are in the same room and thus may speak with each other, for instance, each user is limited to a respective isolated view of the VR video. Thus, these users may view different portions and times in an output of the VR video which may thus make verbal communication "outside" of this output both frustrating and inefficient.

Although techniques have been developed to represent the users within a VR scene using avatars, these techniques are not able to efficiently indicate "where the user is looking" within the scene but rather are limited to providing an indication of a presence of the user within the VR scene. A user viewing an avatar of another user within a VR video, for instance, may not be readily able to determine, with specificity, at which portion of the VR video the other is looking. This lack of precision may force the user to repeatedly look back-and-forth at the avatar and a general direction, toward which, the avatar is positioned to determine "where the other user is looking," which is both inefficient and frustrating.

Additionally, in another conventional system, frames of a VR video are displayed as a 2D equirectangular projection of a sphere in a two dimensional user interface. Thus, this view may be readily shared by multiple users. However, it is typically difficult to view and readily understand this 2D equirectangular projection by the users directly due to an appearance of distortion because the sphere is redefined to follow these two dimensions. Accordingly, users of such systems are forced to go back and forth between viewing the 2D equirectangular projection and use of a headset to understand what is being viewed as part of the frame, e.g., through stereoscopic images formed from the projection to provide an appearance of depth. As a result, this conventional technique fails to support efficient collaborative review between users due to the requirement of multiple devices.

Further, conventional techniques to share a view of the VR video cause nausea and are thus avoided. In one conventional example, source and reviewing users of respective source and reviewing VR devices share a view in the output of a VR video that is configured to support output of different views within frames of the VR video as described above. The source user and respective source VR device control navigation with respect to the VR video. Therefore, movement of a source user's head may be used to control "where the user is looking" with respect to a frame of the VR video. As a result, the source user does not experience nausea because movement of the source user's head follows movement within a VR scene output as part of the VR video. The reviewing user, on the other hand, experiences nausea in this conventional techniques because the movement of the reviewing user's head does not follow movement within the VR scene of the VR video output by the reviewing VR device. Thus, this conventional example limits an amount of time the reviewing user can view an output of the VR video as controlled by the source user without becoming sick.

Accordingly, techniques and systems are described to support collaboration and reduce nausea between VR devices in the output of VR video. In one example, a viewport is configured for output in conjunction with the VR video. The viewport is configured such that a reviewing user of a reviewing VR device may readily determine where a source user of a source VR device is looking within an output of VR video without experiencing nausea.

The source VR device, for instance, includes orientation tracking sensors that are used to define an orientation with respect to an output of the VR video by the source VR device. The orientation tracking sensors may be configured in a variety of ways to detect this orientation, including optical tracking, accelerometers, magnetometers, inertial sensors, cameras (e.g., forward facing or rear facing for eye tracking) and so forth. The orientation, for instance, may be used to define a likely orientation of the source user's head in three dimensional space using six degrees of freedom, e.g., rotation in lateral, longitudinal, and perpendicular axes as pitch, roll, and yaw as further described in relation to FIG. 3.

This orientation is then used in comparison with coordinates of a frame of the VR video (e.g., as a sphere) to generate a 2D portion that is rendered by the source VR device, e.g., as stereoscopic images for viewing by respective left and right eyes of the source user based on a field-of-view supported by a display device. The frame, for instance, may be configured as a 2D equirectangular projection of a sphere. The coordinate system may employ standard latitude (phi) and longitude (lambda) coordinates that are similar to coordinates used for globes and maps of Earth. Thus, the orientation defined by the orientation defines "where the user is looking" with respect to the frame. In this way, movement of the source user's head may be used to define "where" the source user is looking with respect to a VR scene of the VR video. Other examples are also contemplated, such as an orientation of the source VR device itself in three-dimensional space, such as when configured as a mobile phone or tablet that is configured to be held by one or more hands of the source user.

In this example, orientation data that describes this orientation is also used to support collaboration with a reviewing user of a reviewing VR device, i.e., between different VR devices. The orientation data used to control output of the VR video by the source VR device is also communicated to a reviewing VR device of a reviewing user. In this example, network and computational efficiency is increased by communicating the orientation data and not the VR video, itself, and thus protects against "lag" experienced in the output of the VR video by the reviewing device.

This orientation data is then used by the reviewing VR device to generate a viewport that indicates the portion of the VR video output by the source VR device. In this way, a reviewing user of the reviewing VR device may efficiently and accurately determine a portion of the VR video that is output by the source VR device. Additionally, the viewport may be configured to reduce a likelihood of nausea by the reviewing user and thus overcome the challenges of conventional shared VR viewing techniques.

In one example, the viewport defines a portion of the VR video output by the reviewing VR device that is also output by the source VR device. The viewport, for instance, may be defined using a border within an output of the VR video of the reviewing VR device. The border defines what portion of the VR video is also output by the source VR device. Thus, a reviewing user of the reviewing VR device may readily determine what portion of the VR video is output by the source VR device. The border may be visually distinguished to indicate correspondence with respective ones of a plurality of source VR devices, e.g., associated colors.

Additionally, this viewport also protects against nausea that otherwise would be experienced by the reviewing user using conventional sharing techniques. Movement of the viewport in relation to the output of the VR video, for instance, is controlled by orientation data received from the source VR device. However, movement of the VR video, over which, the viewport is displayed is controlled based on orientation data detected by the reviewing VR device, itself. Thus, movement of the VR video as output by the reviewing VR device follows movement of the reviewing user's head. In this way, movement of the VR video follows expected movement of the reviewing user's head and thus does not cause nausea to the reviewing user.

In an implementation, a user interface element is used to guide the reviewing user when the portion of the VR video output by the source VR device is not also currently output by the reviewing VR device. The reviewing VR device and the source VR device, for instance, may output different portions of a frame of the VR video that do not overlap. As a result, the viewport as a border is not currently displayed by the reviewing VR device. Therefore, a user interface element is generated by the reviewing VR device to indicate a relationship between these portions and thus indicate to the reviewing user "where to look" (e.g., in which direction to make a head turn) to view the viewport.

The user interface element, for instance, may be configured as a visual user interface element to indicate a direction "where to look" in order to locate the viewport in an output of the VR video, e.g., as an arrow. In another instance, the user interface element is output at least in part using audio to also indicate a direction in which the reviewing user's head is to turn to view the viewport, e.g., using spatial audio techniques. Spatial audio techniques include rendering of a mono audio channel using an HRTF (head-related transfer function) that describes how sound is modified by the shape of the ear as it enters the ear canal. This provides an ability to render audio data as appearing from a front, behind, above, and below the reviewing user, even though sound resulting from this rendering may have equal loudness in the left and right ears. As a result, the user interface element as output via spatial audio techniques by the reviewing VR device may be used to provide audio clues to guide the reviewing user as to where to locate the viewport in the output of the VR video in instances in which the viewport is not currently displayed by the reviewing VR device.

In another example, the viewport is configured as a thumbnail by the reviewing VR device that includes the portion of the VR video output by the source VR device. Thus, like the above example, movement between different portions of the VR video within the viewport is controlled by the orientation data received by from the source VR device. On the other hand, movement between different portions "outside" of the viewport within a user interface of the reviewing device are controlled by orientation data detected by the reviewing VR device, itself. In this way, a likelihood of nausea is also reduced and even prevented in that movement with respect to the VR video outside of the viewport follows movement of the reviewing user's head as expected. In this other example, output of the viewport as the thumbnail remains displayed in the user interface regardless of where the reviewing user navigates within the output of the VR video by the reviewing VR device.

The viewport may also include options to automatically synchronize a time and/or display of the VR video between the source and reviewing VR devices. The option to synchronize the time, for instance, is selectable by the reviewing VR device to synchronize a time in the output of the VR video at the reviewing VR device to a time with relation to the VR video as output by the source VR device. In this way, navigation within the output of the VR video is still controllable by movement of the reviewing VR device, e.g., to look at different portions through movement of the user's head, and thus protects against nausea.

The option to synchronize the time and display is selectable by the reviewing VR device to synchronize both the time and display of the VR video as output by the reviewing VR device. The portion of the VR video output by the reviewing VR device is thus controlled by orientation data obtained from the source VR device and thus both devices display the same portions of the VR video. However, as previously described this may cause nausea. Accordingly, an anti-nausea portion is also generated in this example and output in conjunction with the VR video, e.g., as a series of semi-translucent circles along a periphery of a user interface. Movement of the anti-nausea portion is controlled based on orientation data of the reviewing VR device and thus follows expected movement of the device. This acts to reduce and even prevent nausea experienced by the reviewing user of the reviewing VR device, even when output of the VR video as specified by the source VR device consumes an entirety of a field-of-view supported by the output device of the reviewing VR device.

The anti-nausea portion, for instance, may be configured as a series of semi-translucent user interface elements (e.g., circles) that are disposed over an output of the VR video. The user interface elements are configured to follow movement of the reviewing user's head to move (e.g., scroll) within the user interface to appear stationary with respect to the reviewing user's physical environment. In other words, the user interface elements move in an opposite direction and amount to movement of the reviewing user's head. Thus, the user interface elements may appear to "remain stationary" with respect to a physical environment of the reviewing user by movement in an opposite direction and amount of movement of the user's head.

Head movement of the reviewing user, for instance, may be used to "look up" in a VR scene of a VR video. In response, the reviewing VR device causes the user interface elements to scroll in the user interface by a corresponding distance downward such that the user interface elements each appear stationary to mimic movement with respect to a physical environment of the user. The reviewing VR device, for instance, configures the user interface to have successive user interface elements appear at a top of the user interface and removed at a bottom of the user interface in an amount of movement defined by the movement of the user's head. At the same time, movement within the VR video is controlled by the source VR device. Thus, the anti-nausea portions reduce a likelihood of nausea experienced by the reviewing user of the reviewing VR device even when movement with respect to the VR video, itself, is controlled by the source VR device.

Techniques and systems are also described in which annotations are included as part of collaboration data to support collaborative review between the source and reviewing VR devices. In this way, communication of the collaboration data, and not the streaming of the VR video itself as performed in conventional shared view techniques as described above, may support real time interaction between the devices through efficient use of network and computational resources. The collaboration data 130, for instance, may be used to generate annotations by the reviewing VR device in output in conjunction with a locally stored version of the VR video. Thus, the amount of collaboration data 130 that is communicated between the devices is significantly less than streaming the VR video having the annotations included as part of the video.

A source VR device, for instance, may output VR video for viewing by the source user as previously described. A user input is received by the source VR device to input an annotation. The source user, for instance, may select an option in the user interface to provide an annotation. In response, the source VR device pauses an output of the VR video in this instance. A user input is also received by the source VR device specifying an annotation, e.g., a freeform or other series of lines defining a portion of the VR video, a spoken utterance, gesture, and so forth. The user input in this example is associated by the source VR device with a timestamp corresponding to a frame being paused in the VR video. The annotation is also associated with orientation data describing an orientation used by the source VR device. The orientation in this instance is used to associate the annotation with a coordinate system of the VR video, e.g., as drawn over by the freeform line. Other examples are also contemplated, such as to collect passive inputs automatically and without user intervention as annotations, e.g., detection of audio that is indicative of a user's mood such as a sigh or laugh.

Collaboration data that includes the annotation, timestamp, and orientation data is then transmitted by the source VR device to the reviewing VR device. Thus, like before, the collaboration data may promote network and computational efficiency rather than communication of the VR video, itself. This collaboration data is then used by the reviewing VR device to control output of the annotation. The reviewing VR device, for instance, may display an indication with respect to a timeline indicating that an annotation is associated with a respective timestamp. Selection of the indication may then cause output of the annotation at the respective time (e.g., frame) in the output of the VR video based on the timestamp and respective portion in that frame of the VR based on the orientation data. In this way, the reviewing user may efficiently and accurately view the annotation and thus collaborate with the source user between the reviewing and source VR devices.

The annotation may also be output automatically and without user intervention by the reviewing VR device. The reviewing VR device, for instance, may output the VR video as normal in which navigation within the VR video is controlled by the reviewing VR device. The collaboration data may then be used to output a viewport as described above based on the orientation data as well as the timestamp. The viewport, for instance, may be output over a plurality of frames based on the timestamp such that the reviewing user is able to view the viewport without pausing output of the VR video. The annotation is displayed within this viewport, e.g., over the plurality of frames. This may be performed to mimic how the source user input the annotation (e.g., to mimic the drawing of the freeform line over a series of frames) or show a completed version of the annotation as copied over successive frames in the output of the VR video. In this way, the annotation is output with respect to the VR video in a manner that is intuitive, may be located through user interface elements described above, and reduces a likelihood of nausea of conventional techniques and systems.

Techniques and systems are also described to support efficient distribution of VR video. A video producer, for instance, may interact with a content editing application to create VR video, e.g., a VR video, and wish to get the thoughts of a couple of reviewers. Conventional techniques to do so involved posting the VR video to a website (e.g., YouTube® or Facebook®), "side loading" the video locally to the VR device and then accessing a media player to view the video, and so on. Thus, each of these conventional techniques are modal in that a reviewer is forced to navigate "outside" of a user interface of the content editing application to share the content and receive comments that result from a review of the video.

Accordingly, non-modal techniques are described in the following sections that support sharing and review of VR video within a context of the content editing application. Continuing with the previous example, the video producer creates VR video and wishes to receive comments from some reviewers. To do so, the video producer selects an option as part of the content editing application to make the VR video available for sharing, e.g., locally by a local area network (LAN). In response, the content editing application is executed to communicate a user interface element (e.g., beacon data) wirelessly that indicates availability of the VR video. Reviewers, through interaction at respective local applications at respective VR devices, initiate a direct wireless connection with a computing device of the video producer, e.g., via Wi-Fi. Once initiated, the video review may grant permission for this access (e.g., verify that the reviewer is to receive the content) through selection of an option in a user interface which causes the VR video to be streamed to the respective VR devices. In an implementation, this is performed via a broadcast configured for receipt by multiple VR devices simultaneously.

Reviewers then view the VR video via respective VR devices and communicate collaboration data based to the computing device of the video producer that is generated through user interaction with the content. The collaboration data, for instance, may include annotations as described above, a "thumbs up" or "thumbs down" that is associated with respective times or coordinates within the VR video, and so on. This collaboration data is then output in the user interface to the video producer by the computing device. In this way, the video producer may remain within a context of the content editing application and share and receive comments in a non-modal manner A variety of other examples are also contemplated, which are described in greater detail in corresponding sections.

Example Environment

FIG. 1 is an illustration of a digital medium environment 100 in an example implementation that is operable to employ techniques described herein. The illustrated environment 100 includes reviewing and source VR devices 102, 104 that are associated with respective reviewing and source users 106, 108. The reviewing and source VR devices 102, 104 are communicatively coupled, one to another, via a network 132. The reviewing and source VR devices 102, 104 may be configured in a variety of ways, such as glasses or goggles that are to be worn by respective heads of the reviewing and source users 160, 108 as illustrated, mobile phones or tablets, wearable devices, stand-alone devices (e.g., signs), and so forth.

The reviewing and source VR devices 102, 104 are each illustrated as including a respective VR content module 110, 112. The VR content modules 110, 112 are configured to support capture and/or rendering of VR video 114(1), 114(2) for output to respective reviewing and source users 106, 108, which is illustrated as stored by respective storage devices 116, 118. The VR video 114(1), 114(2) is referred to by similar reference numbers in this example to indicate the VR video includes matching subject matter, e.g., is "the same" VR video, captures the same VR scene, and so forth. Accordingly, VR video 114 may refer to either or both instances of VR video 114(1), 114(2).

This output may be accomplished by an output device of the VR devices 102, 104 that is configurable in a variety to ways, such as to support visual output (e.g., via a display device), audio output (e.g., via speakers), tactile output (e.g., via a haptic device), and so forth. In this way, output of VR video 114(1), 114(2) may be configured to support an immersive experience in which the users "feel like they are there."

As previously described, conventional techniques used to support this immersive experience may limit an ability for the reviewing and source uses 106, 108 to communicate with each other. In the illustrated example, the VR video 114 is configured to support a three hundred and sixty degree view 120 of a VR digital scene. Accordingly, a portion 122 output by the reviewing VR device 102 may differ from a portion 124 output by the source VR device 104. Thus, even though the same item of VR video 114 may be output by both the reviewing and source VR devices 102, 104, interaction with the VR video 114 performed by those devices may vary in a multitude of ways. As a result, conventional techniques used to communicate (e.g., engage in a collaborative review) between these devices may fail due to these complications.

Accordingly, the VR content modules 108, 110 include respective collaboration modules 126, 128 that are configured to communicate collaboration data 130 between the devices. In the illustrated instance, the collaboration data 130 is communicated from the source VR device 104 to the reviewing VR device 102, which are named as such to indicate where the collaboration data 130 originated. It should be readily apparent that these roles may also change to support communication in a reverse direction.

The collaboration modules 126, 128 may be configured to support a variety of different types of collaboration based on the collaboration data 130, such as viewports, annotations, synchronized viewing, anti-nausea, non-modal review, and so forth. In the following discussion, operation of the VR devices to support interaction with VR content is first described. Use of collaboration data 130 is then described, first through use of a viewport, anti-nausea portions, annotations, and non-modal interaction in corresponding sections.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Viewport Generation Based on Orientation

In this section, a viewport is generated by a reviewing VR device 102 based on an orientation used by a source VR device 104 to view VR video. The viewport is configured such that a reviewing user 106 of the reviewing VR device 102 may view which portion is being viewed by the source user 108 of the source VR device 104 without experiencing nausea. Further, communication of the collaboration data 130 and not the VR video itself may provide increased efficiency of network and computational resource to support output in real time and reduced lag in comparison to conventional shared streaming techniques. The discussion begins with how portions of a frame of VR video are determined for output based on an orientation determined using orientation tracking sensors. Sharing of orientation data that describes this orientation is then discussed, which is used to generate the viewport in a manner that prevents nausea as experienced by conventional VR video sharing techniques.

Figure 2:
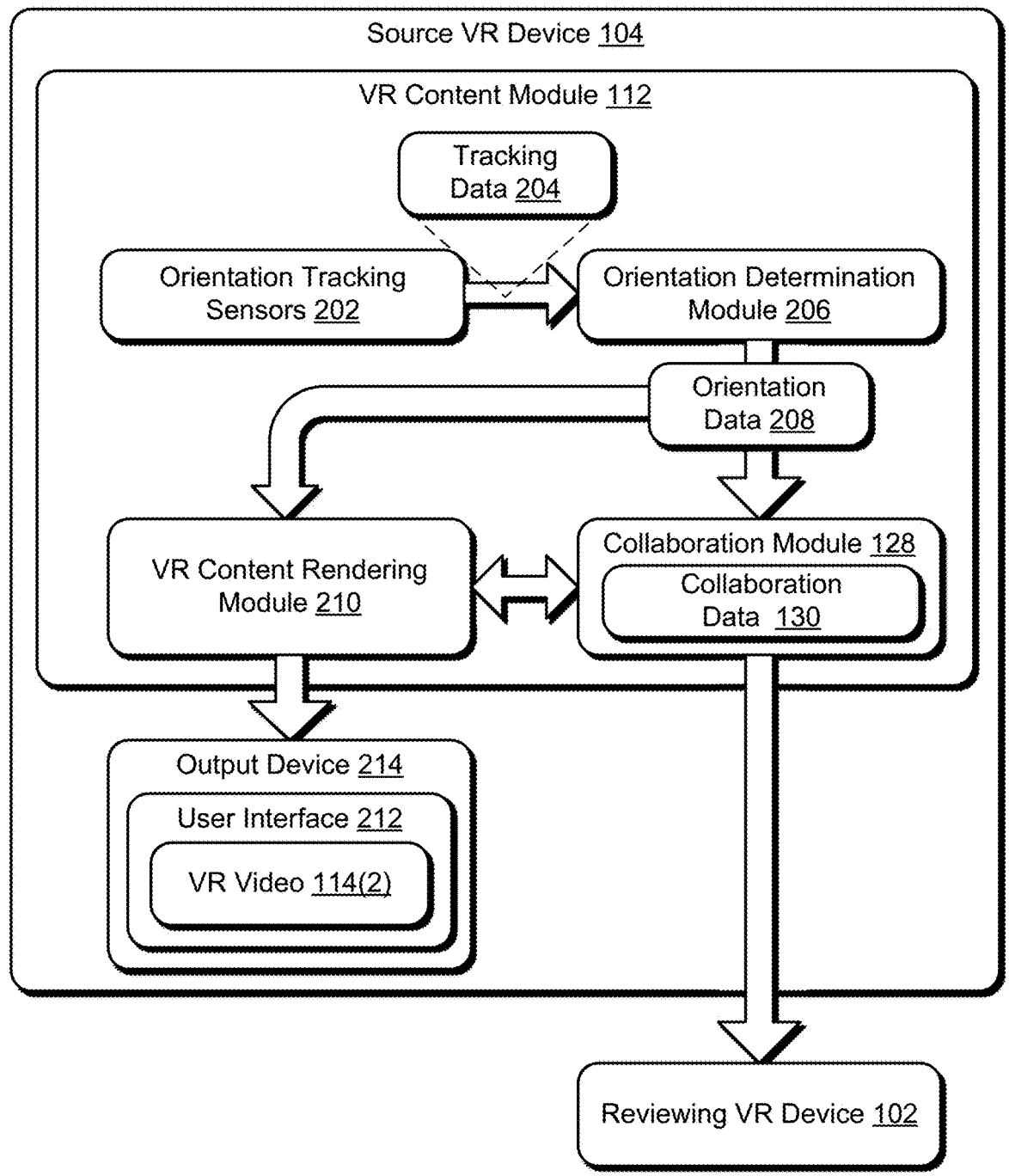
FIG. 2 depicts an example implementation showing operation of a source VR device as rendering VR video and generating collaboration data for communication to a reviewing VR device of FIG. 1.

FIG. 2 depicts an example implementation 200 showing operation of the source VR device 104 as rendering VR video 114(2) and generating collaboration data 130 for communication to the reviewing VR device 102. To begin, the VR content module 112 includes orientation tracking sensors 202 that are configured to generate tracking data 204 that is usable by an orientation determination module 206 to generate orientation data 208 that describes an orientation. The orientation is compared with a coordinate system of VR video 114(2) by a VR content rendering module 210 to determine which portion of the VR video 114(2) is to be rendered in a user interface 212 by an output device 214 of the source VR device 104.

Figure 3:
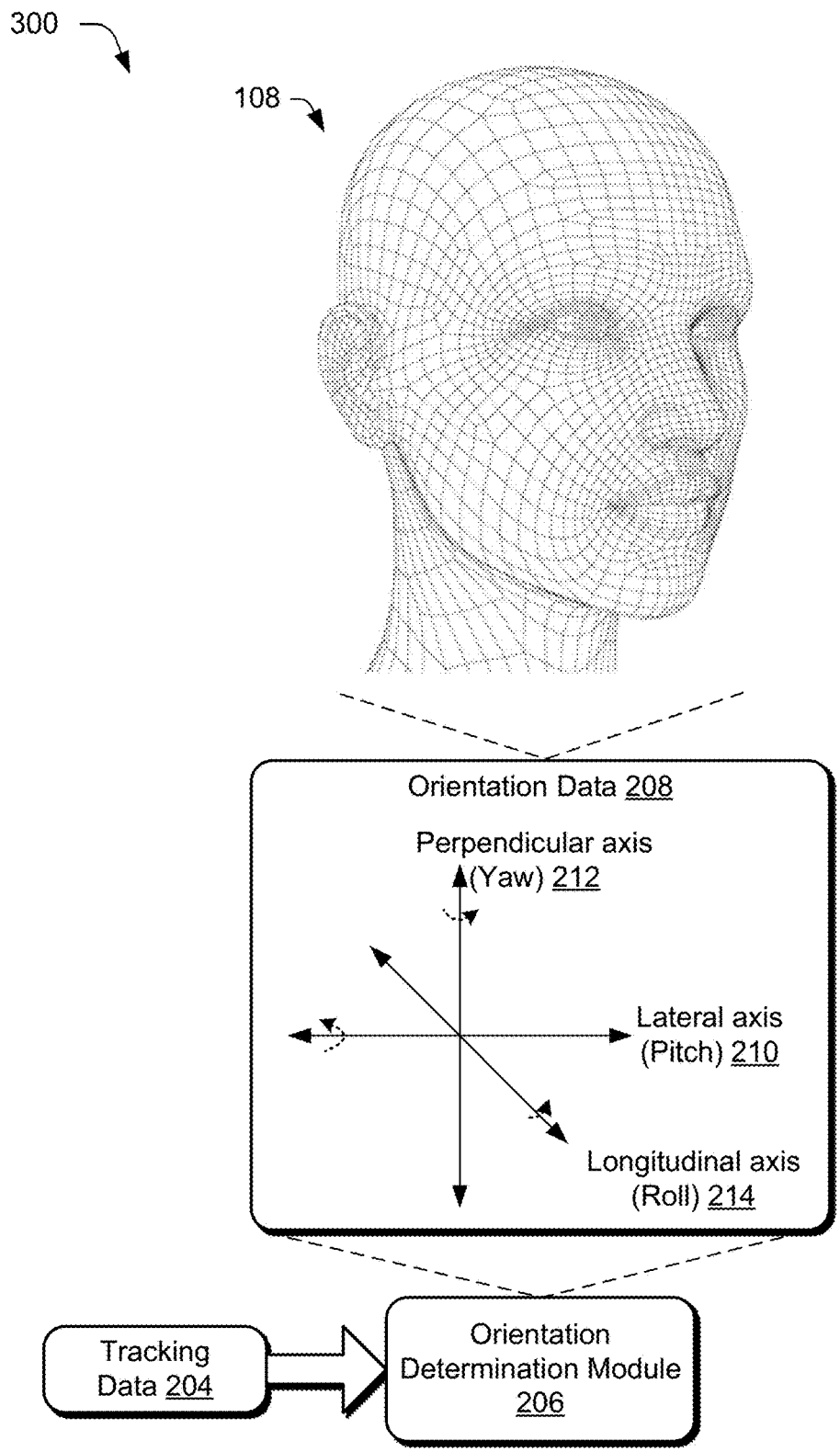
FIG. 3 depicts orientation tracking sensors that are configured to output tracking data that is usable by an orientation determination module to track a likely orientation of a head of a source user.

As shown in FIG. 3, for instance, the orientation tracking sensors 202 are configured to output tracking data 204 that is usable by the orientation determination module 206 to track a likely orientation of a head of the source user 108, e.g., in three dimensional space. In this illustrated example, this is performed to support six degrees of freedom (6 DoF) as rotation about a lateral axis 210 (i.e., pitch), perpendicular axis 212 (i.e., yaw), and longitudinal axis 214 (i.e., roll). As a result, the orientation data 208 is usable to describe head movements as forward and backwards, side to side, and shoulder to shoulder.

The tracking data 204 may be output from a variety of types of orientation tracking sensors 202, both singly and in combination. For example, the orientation tracking sensors 202 may be configured as a gyroscope, accelerometer, magnetometer, inertial sensor, and so forth to determine movement associated with the source VR device 104. This may include movement of the source VR device 104 itself as a whole (e.g., head movement) and/or a controller communicatively coupled to the source VR device 104, e.g., through use of one or more handheld controllers. In another example of a headset, light emitting diodes (LEDs) are disposed around a periphery of a headset to support three hundred and sixty degree head tracking through use of an external camera that detects light emitted from these diodes.

Other examples include use of a camera to detect landmarks in a physical environment, in which, the source VR device 104 is disposed (e.g., corners of a table) and detect movement in relation to those landmarks through capture of successive digital images. A variety of other examples are also contemplated, including eye tracking in which a camera pointed towards an eye of the source user 108 (e.g., as an infrared sensor) to determine "where the user is looking" with respect to portions of the output device 214.

Regardless of a format of the tracking data 204, the orientation determination module 206 is configured to abstract the tracking data 204 into orientation data 208 that describes the orientation that is to be used by the VR content rendering module 210 to render respective portions of the VR video 114(2). The orientation data 208, for instance, may indicate changes to orientations that are usable to navigate between respect portions of a frame of the VR video 114(2). In this way, the orientation data 208 is usable to control which portions of the VR video 114(2) are and are not rendered by the output device 214 as further described as follows.

Figure 4:
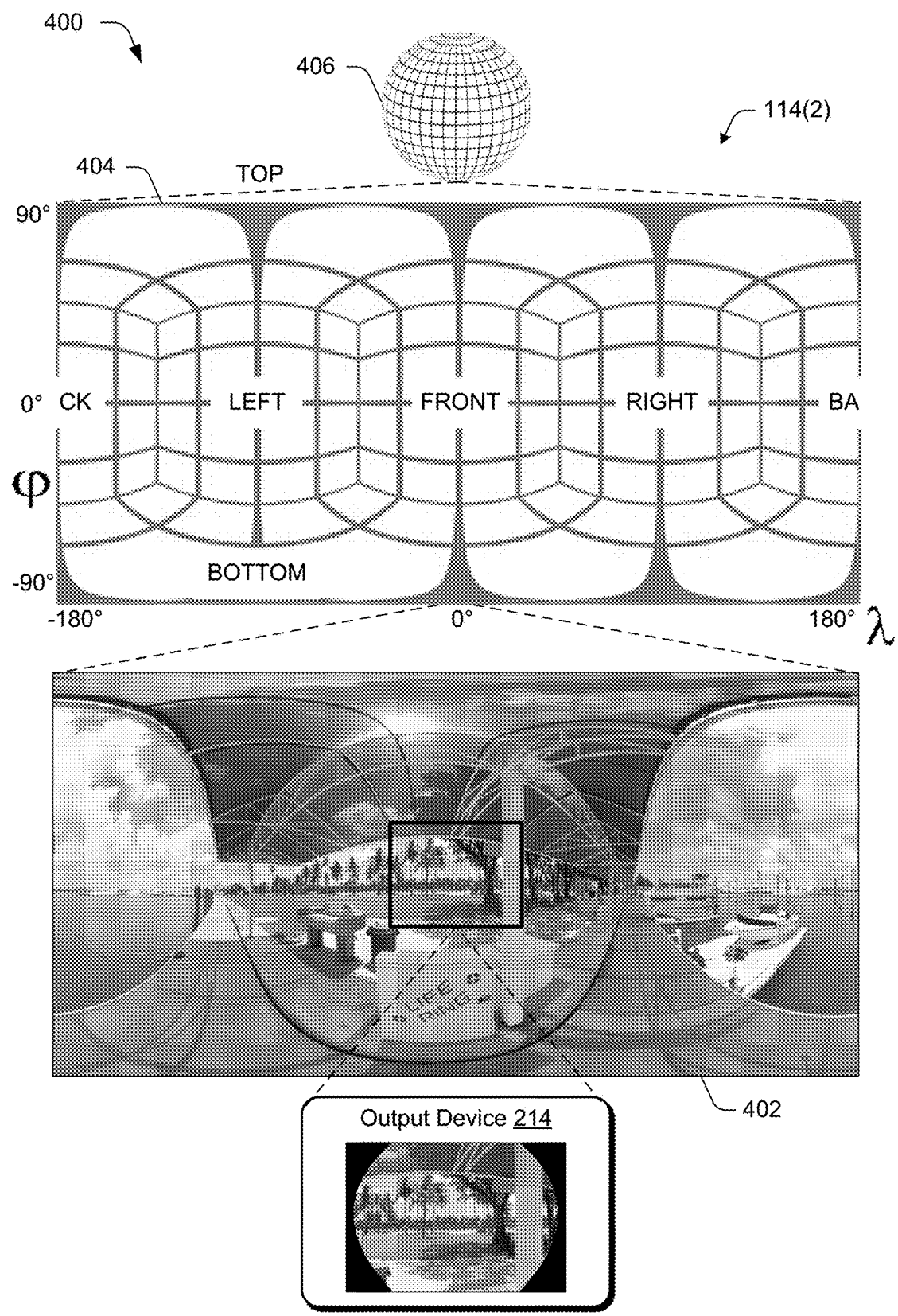
FIG. 4 depicts an example implementation of a frame of VR video and corresponding coordinate system usable to determine a portion of the VR video to be output with respect to an orientation defined by the orientation data of FIG. 3.

FIG. 4 depicts an example implementation 400 of a frame 402 of VR video 114 and corresponding coordinate system 404 usable to determine a portion of the VR video 114 to be output with respect to an orientation defined by the orientation data 208 of FIG. 3. The frame 402 in this example is configured as a 2D equirectangular projection of a sphere 406. The coordinate system 404 uses standard latitude (phi) and longitude (lambda) coordinates that are similar to coordinates used for globes and maps of Earth. Any other coordinate system may be used without departing from the scope of the techniques and systems described herein.

The illustrated coordinate system 404 also contains a visual guide displaying what parts of the frame 402 of the VR video 114 are disposed in relation to a orientation defined by the orientation data 208. In the illustrated example, the grass in the frame 402 is in front of the viewer, the concrete sidewalk/dock runs out to the left and right of the viewer, and the ocean is behind the viewer. Panoramic examples are also contemplated, e.g., to support three hundred and sixty degree movement "left" and "right" as shown in FIG. 1.

The orientation data 208 is used by the VR content rendering module 210 to generate a portion of the frame 402 for rendering and output by output device 214. The orientation data 208, for instance, may specify an initial orientation of the user's head as looking at the "front" as illustrated. Subsequent changes to that orientation as specified by subsequent sets of orientation data 208 is used to navigate to different portions of the VR video 114 based on a comparison of the orientation with respective coordinates 402.

From this orientation, the VR content rendering module 210 determines a field of view supported by the output device 214 in relation to the orientation and selects a portion 408 of the frame 402 based on the coordinates and field of view. This is performed to support a stereoscopic view by both eyes of the user to support an appearance of depth. Thus, the orientation data 208 is used to control what portions of the frame 402 of the VR video 114(2) are output by the source VR device 104.

Returning again to FIG. 2, the orientation data 208 is also provided to a collaboration module 128 for inclusion as part of collaboration data 130. The collaboration data 130, which includes the orientation data 208, is then communicated to the reviewing VR device 102 to support collaboration between the devices.

Figure 5:
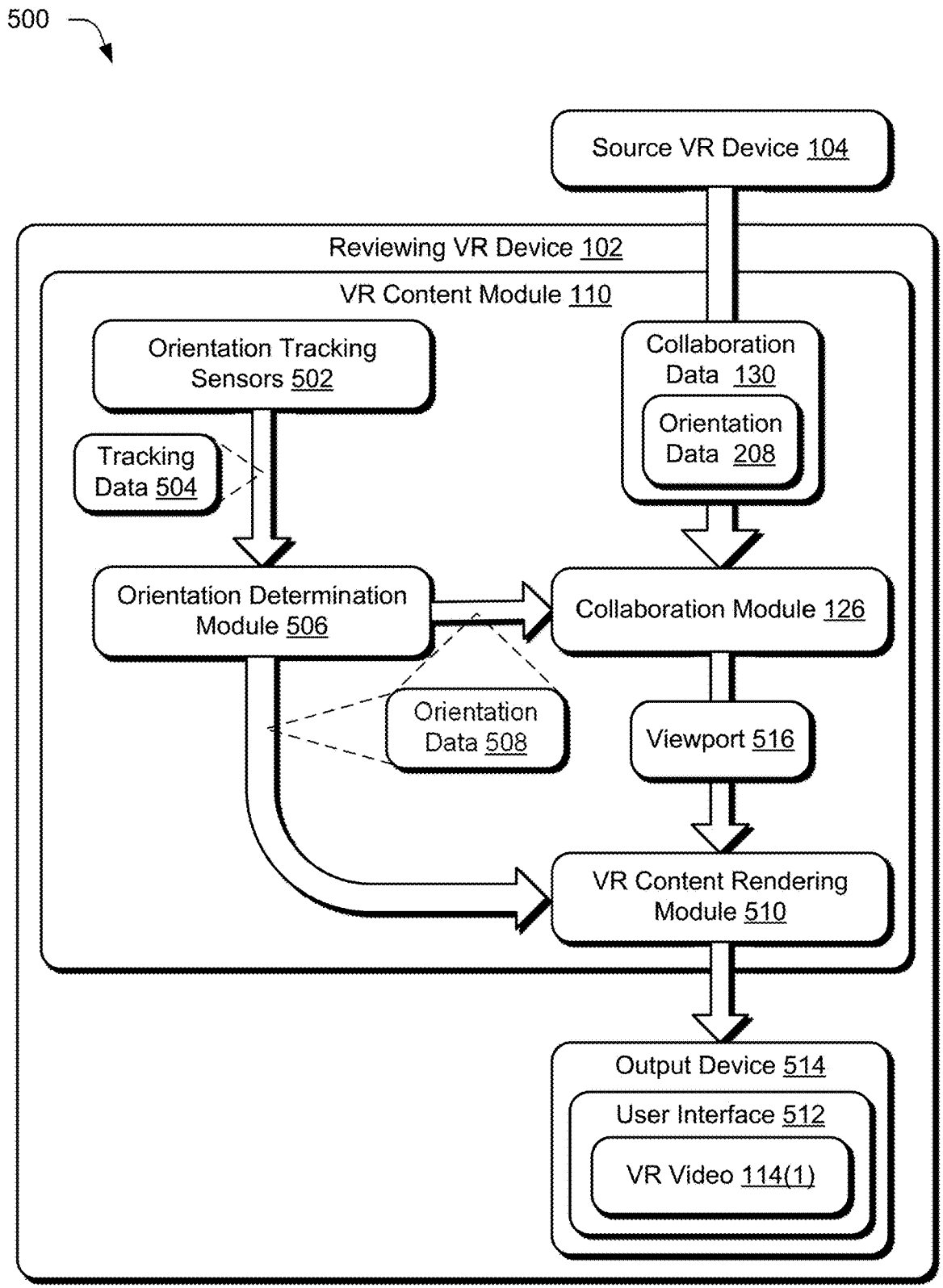
FIG. 5 depicts an example implementation showing operation of the reviewing VR device as rendering VR video and generating a viewport from the collaboration data received from the source VR device.

FIG. 5 depicts an example implementation 500 showing operation of the reviewing VR device 104 as rendering VR video 114(1) and generating a viewport from the collaboration data 130 received from the source VR device 104. Like before, the VR content module 110 includes orientation tracking sensors 502 that are configured to generate tracking data 504 that is usable by an orientation determination module 506 to generate orientation data 508 that describes an orientation.

The orientation is compared with a coordinate system of VR video 114(1) by a VR content rendering module 510 to determine which portion of a frame of the VR video 114(1) is to be rendered in a user interface 512 by an output device 514 of the reviewing VR device 102. Thus, like the source VR device, the reviewing VR device 102 is configured to control output of portions of the VR video 114(1) based on the orientation described by the orientation data 508 that is generated locally by the reviewing VR device 102.

The reviewing VR device 102 also receives collaboration data 130 from the source VR device 104. The collaboration data 130 includes orientation data 208 that describes an orientation used by the source VR device 104 to control output of VR video 114(2). The orientation of the source VR device 104 is used by the collaboration module 126 along with the orientation defined in the orientation data 508 by the reviewing VR device 102 to generate a viewport 516 for output in conjunction with the VR video 114(1) in the user interface 512. The viewport 516 is configured to support collaborative review by indicating which portion of the VR video 114(1) is output by the source VR device 104 and may do so with reduced nausea as compared to conventional sharing techniques.

FIGS. 6A, 6B, 6C, 6D depict example implementations in which a viewport is generated based on orientation of a source VR device 104 to indicate a portion of the VR video 114 that is output by both the reviewing and source VR devices 102, 104. In this example, the viewport 516 defines a border that contains a portion of the VR video 114 output by the source VR device 104 based on the orientation data 208. The viewport 516, for instance, may be displayed as a reduced size view of the portion of the VR video 114(2) viewed using the source VR device 104. In an implementation, the portions outside the viewport 516 are visually distinguished respect to the portion of the VR video 114 inside of the viewport 516, e.g., with reduced display intensity. Thus, the viewport 516 defines what portion of the VR video 114 is being viewed using the source VR device 104.

As a result, the reviewing user 106 may readily determine what the source user 108 is "looking at." The reviewing and source users 106, 108 may then engage in a collaborative review, e.g., through spoken utterances that may also be communicated as part of the collaboration data 130 in real time, spoken aloud when in the same room, use annotations as described in greater detail in the corresponding section, and so on to provide feedback back and forth between the users. Further, use of the collaboration data 130, as opposed to streaming the VR video 114(2) from the source VR device 104, supports increased network and computational efficiency with reduced lag in the output by the reviewing VR device 102.

The viewport 516 is disposed over a display of a portion 602 of the VR video 114(1) output by the reviewing VR device 102. Thus, the portion 602 and navigation of the VR video 114(1) is controlled by the reviewing VR device 102 whereas location of the viewport 516 in relation to that output is controlled based on the orientation data 206 received from the source VR device 104. Because navigation between portions of frames of the VR video 114(1) output by the reviewing VR device 102 is controlled by orientation data 508 generated by the reviewing VR device 102, this output protects against nausea experienced by the reviewing VR user 106 because the movement between the portions follows movement of the user's head.

Figure 6A:
FIGS. 6A, 6B, 6C, 6D depict example implementations in which a viewport is generated based on orientation of a source VR device to indicate a portion of the VR video that is output by both the reviewing and source VR devices and that supports navigation of the reviewing VR device with respect to VR video.

As shown at FIG. 6A, for instance, a portion 602 of the VR video 114 output by the reviewing VR device 102 also includes a portion of the VR video 114 output by the source VR device 104 as indicated by the viewport 516. In other words, the viewport 516 as configured as a border defines what portions of the VR video 114 are shared by both the reviewing and source VR devices 102, 104.

Figure 6B:
Figure 6C:

Movement 604 of the reviewing user's 106 head to the right causes corresponding movement to the right to output a different portion 606 of the VR video as shown in FIG. 6B. This movement 608 may continue as shown in FIG. 6C such that the portion 610 of the VR video 114 output by the reviewing VR device 102 does not overlap the portion of the VR video 114 output by the source VR device 104 indicated by the viewport 516. Thus, the viewport 516 is no longer output in FIG. 6C.

In this scenario, a user interface element is generated by the collaboration module 126 of the reviewing VR device 102 to guide the reviewing user 106 when the portion of the VR video output by the source VR device 104 is not also currently output by the reviewing VR device 102. In the illustrated example, the user interface element 612 is configured as a visual user interface element to indicate a direction "where to look" in order to locate the viewport 516 in an output of the VR video 114, e.g., as an arrow. In this example, the user interface element 612 indicates that the reviewing user 106 is to "look left" to find the viewport 516 and thus the portion of the VR video 114(2) that is being viewed using the source VR device 104.

In another instance, the user interface element is output at least in part using audio to also indicate a direction in which the reviewing user's head is to turn to view the viewport, e.g., using spatial audio techniques. Spatial audio techniques include rendering of a mono audio channel using an HRTF (head-related transfer function) that describes how sound is modified by the shape of the ear as it enters the ear canal. This provides an ability to render audio data as appearing from a front, behind, above, and below the reviewing user, even though sound resulting from this rendering may have equal loudness in the left and right ears. As a result, the user interface element as output via spatial audio techniques by the reviewing VR device may also be used to provide audio clues to guide navigation of the reviewing user 106 to locate the viewport 516 in the output of the VR video 114. A variety of other examples are also contemplated, including tactile output via haptic output devices.

Figure 6D:
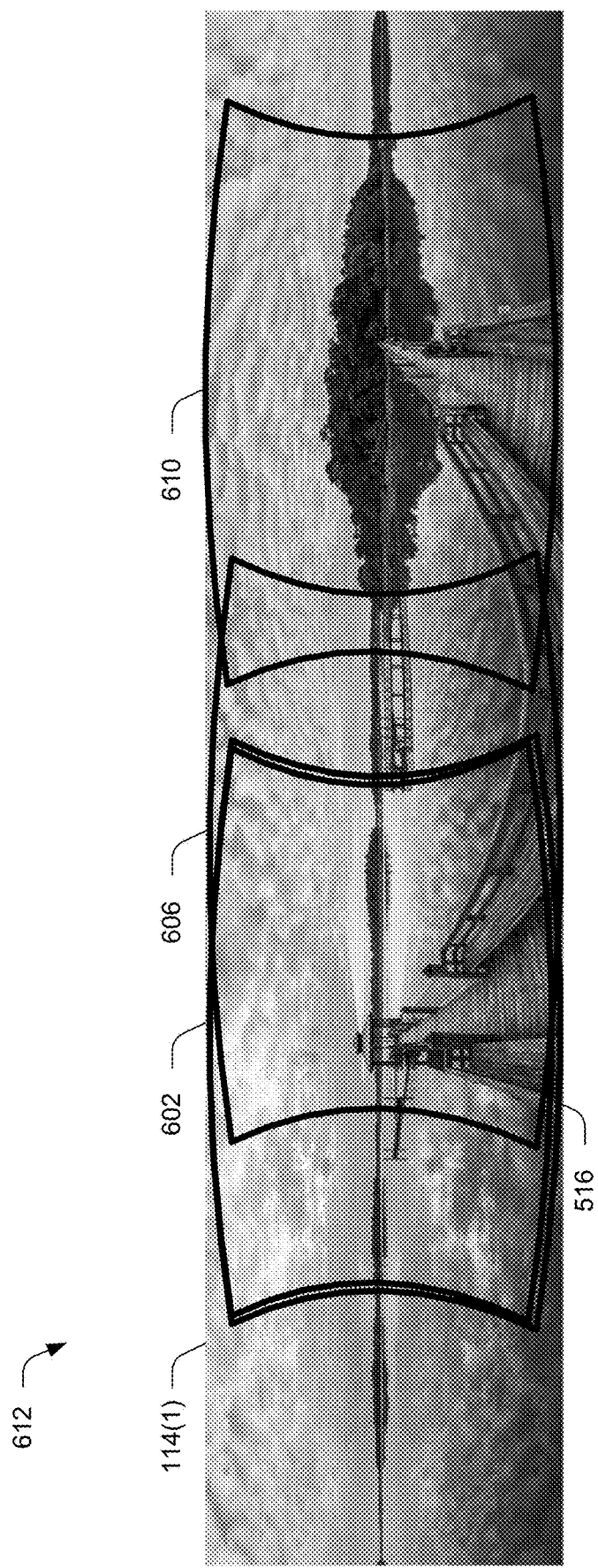

FIG. 6D is an illustration of a full frame 612 of the VR video 114(1). The frame 612 includes the viewport 516 as indicating which portion of the frame 612 is output by the source VR device 104. The frame 612 also includes the successive portions 602, 606, 610 output by the reviewing VR device 102 in response to successive rightward movement 604, 608 of the reviewing user's 106 head as shown in FIGS. 6A-6C. Thus, movement in relation to the frame 612 as output by the reviewing VR device 102 is also controlled by the reviewing VR device 102, which protects the reviewing user 106 against nausea. In this example, the viewport 516 remains stationary with respect to the frame 612 of the VR video 114(1) whereas different portions 602, 606, 610 of the frame 612 of the VR video 114(1) are output within the viewport 516. The reverse may also be performed in which the viewport 516 moves in relation to the frame as controlled by the source VR device 104 but the portion output by the reviewing VR device 102 remains stationary.

Figure 7A:
FIGS. 7A, 7B, 7C, 7D depict example implementations in which a viewport is generated based on orientation and movement of a source VR device to indicate a portion of the VR video through movement of the viewport.
Figure 7B:
Figure 7C:
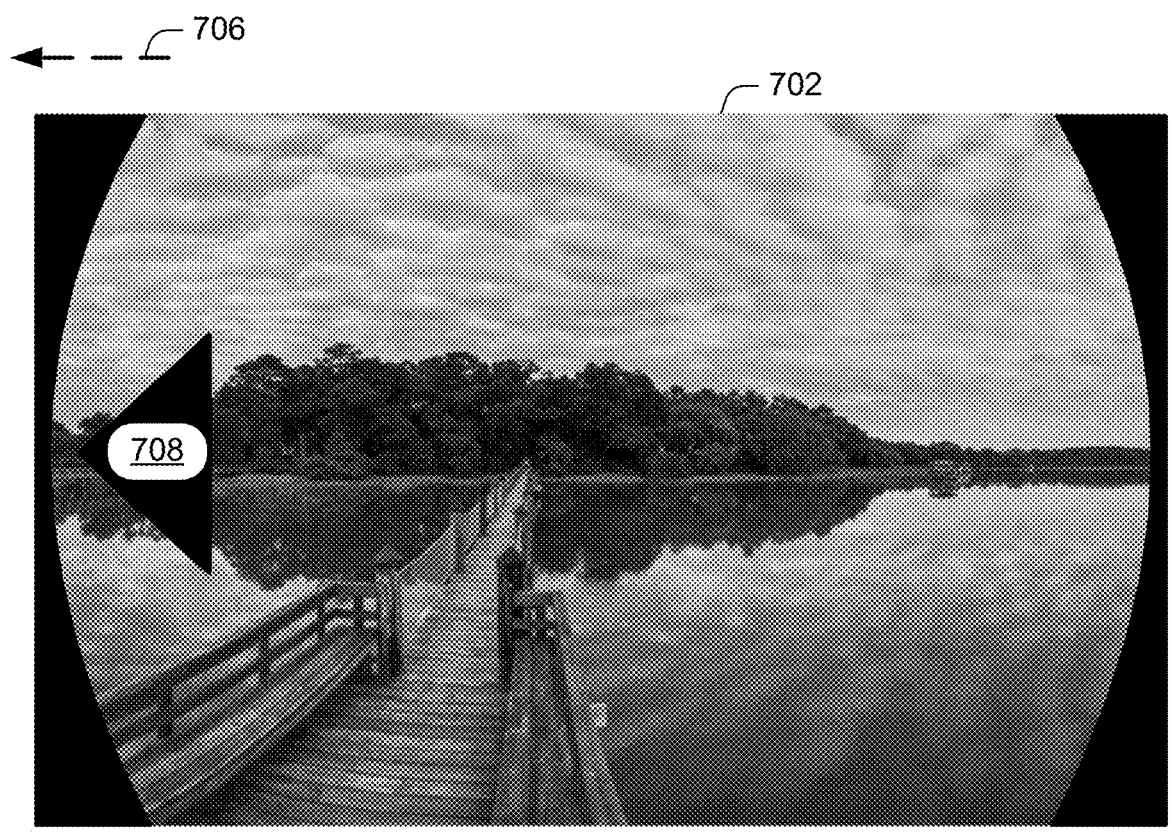
Figure 7D:
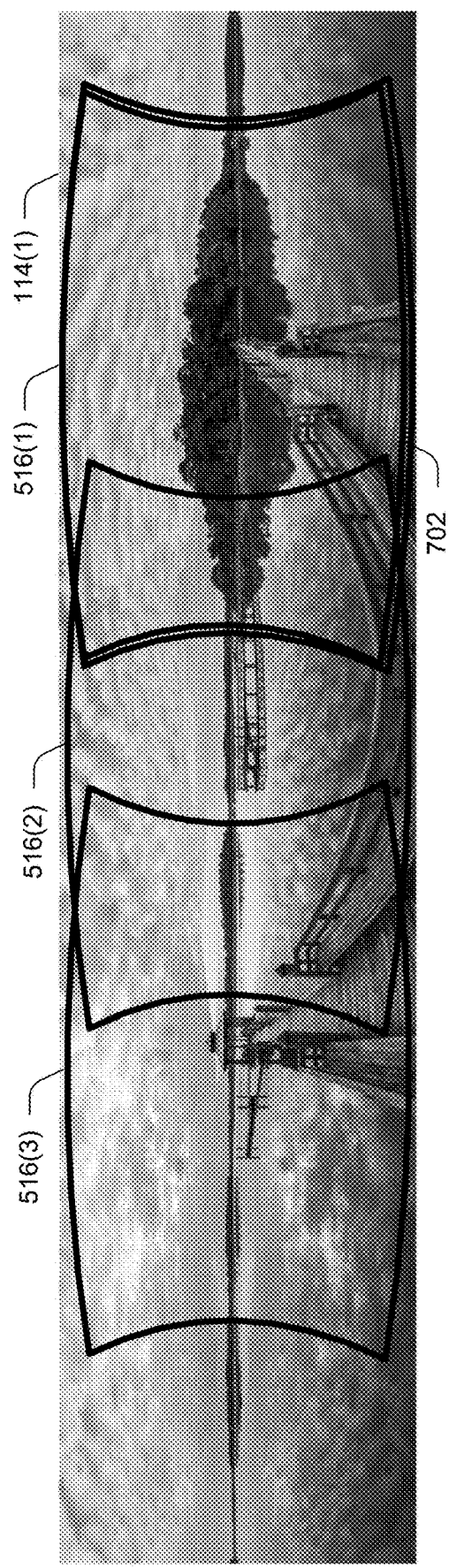

FIGS. 7A, 7B, 7C, 7D depict example implementations in which a viewport 516 is generated based on orientation and movement of a source VR device 104 to indicate a portion 702 of the VR video 114. Like the previous example, the portion 702 of the VR video 114 output by the reviewing VR device 102 also includes a portion of the VR video 114 output by the source VR device 104 as indicated by the viewport 516(1). Movement 704 of the source user's 108 head to the left in this example as shown in FIG. 7B causes corresponding movement of the viewport 516(2) to the left based on orientation data 130 received by the reviewing VR device 102 from the source VR device 104. This movement 706 continues as shown in FIG. 7C such that the viewport is no longer viewable in conjunction with the output of the portion 702 of the VR video 114 output by the reviewing VR device 102. User interface elements are again used to aid the reviewing user 106 in locating the viewport 516, e.g., as a visual user interface element 708, audio user interface element, and so forth.

Thus, like the previous example, location of the viewport 516(1), 516(2), 516(3) in relation to the frame is controlled by the orientation data 208 received as part of the collaboration data 130 from the source VR device 104. However, the portion 702 of the frame of the VR video 114 output by the reviewing VR device 102 is controlled by the reviewing VR device 102, and thus protects against nausea that is experienced using conventional sharing techniques. Thus, movement of the reviewing user in relation to VR video is described in relation to FIGS. 6A-6D and movement of the viewport 516 as controlled by the source VR device 104 is described in relation to FIGS. 7A-7D. It should be readily apparent that movement detected by both the reviewing and source VR device 102, 104 and corresponding navigation of the VR video 114 and viewport 516 is also contemplated which also protects against nausea.

Figure 8:
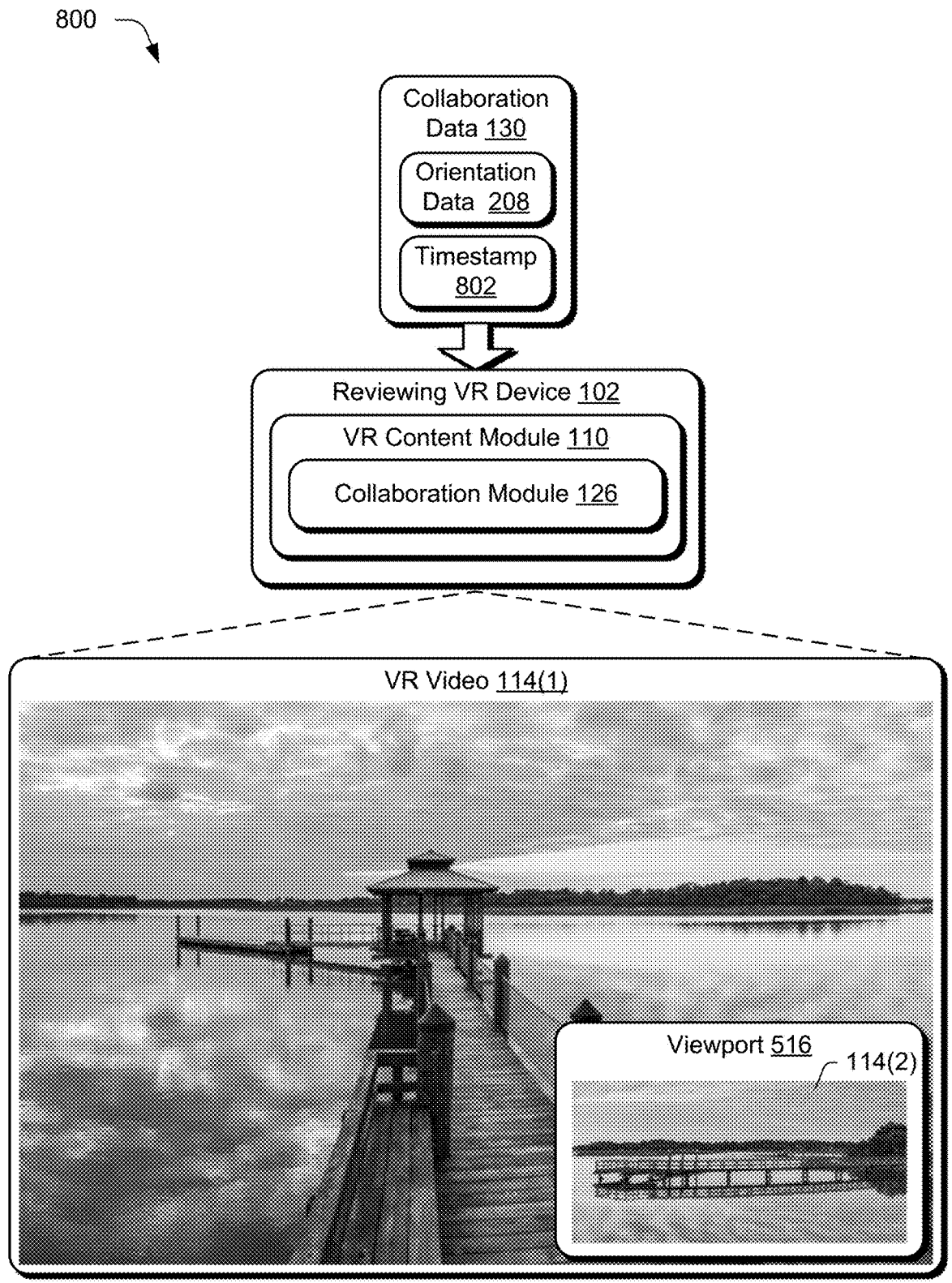
FIG. 8 depicts another example implementation of the viewport that supports asynchronous output with respect to time and orientation in the output of the VR video.

FIG. 8 depicts another example implementation 800 of the viewport 516 that supports asynchronous output with respect to time and orientation in the output of the VR video 114. In the previous examples, the VR video 114 as output by both the reviewing and source VR devices 102, 104 is synchronized with respect to time such that both devices output the same frames of the VR video 114. In this example, the viewport 516 is configured to support asynchronous output of the portion of the VR video 114 output by the source VR device 104.

The reviewing VR device 102, like above, receives collaboration data 130 from the source VR device 104. The collaboration data 130 includes orientation data 208 as previously described that is usable to determine an orientation with respect to frames of a VR video, and from this, determine which portion of the frame is rendered by the source VR device 104.

In this example, the collaboration data 130 also includes a timestamp 802 indicating which frame of the VR video 114 is also being rendered by the source VR device 104. From this, the collaboration module 126 configures the viewport 516 to include the portion of the VR video 114 indicated by the orientation data 208 taken from a frame of the VR video 114 as indicated by the timestamp 802. The viewport 516, for instance, may be output upon receipt of a user input from the reviewing user 106 to "peek" at what the source user 108 is looking at.

In the illustrated example, the viewport 516 is configured to support output of this portion of the VR video 114(2) specified by the collaboration data 130 as a thumbnail. Thus, the viewport 516 is configured to persist in this example regardless of "where the reviewing user 106 is looking" with respect to the VR video 114. The reviewing user 106, for instance, may navigate between different portions of the VR video 114(1) through head movement and have that movement reflected by the output of the VR video 114(1) in the user interface and thus protect against nausea. Movement between respective portions of the VR video 114(2) as output by the source VR device 104 is displayed as thumbnails within the viewport 516. As a result, the output of the VR video 114(2) within the viewport 516 may be performed at a time (i.e., different frames) that the output of the VR video 114(1) outside of this viewport 516 and thus is asynchronous with respect to both orientation and time.

Figure 9:
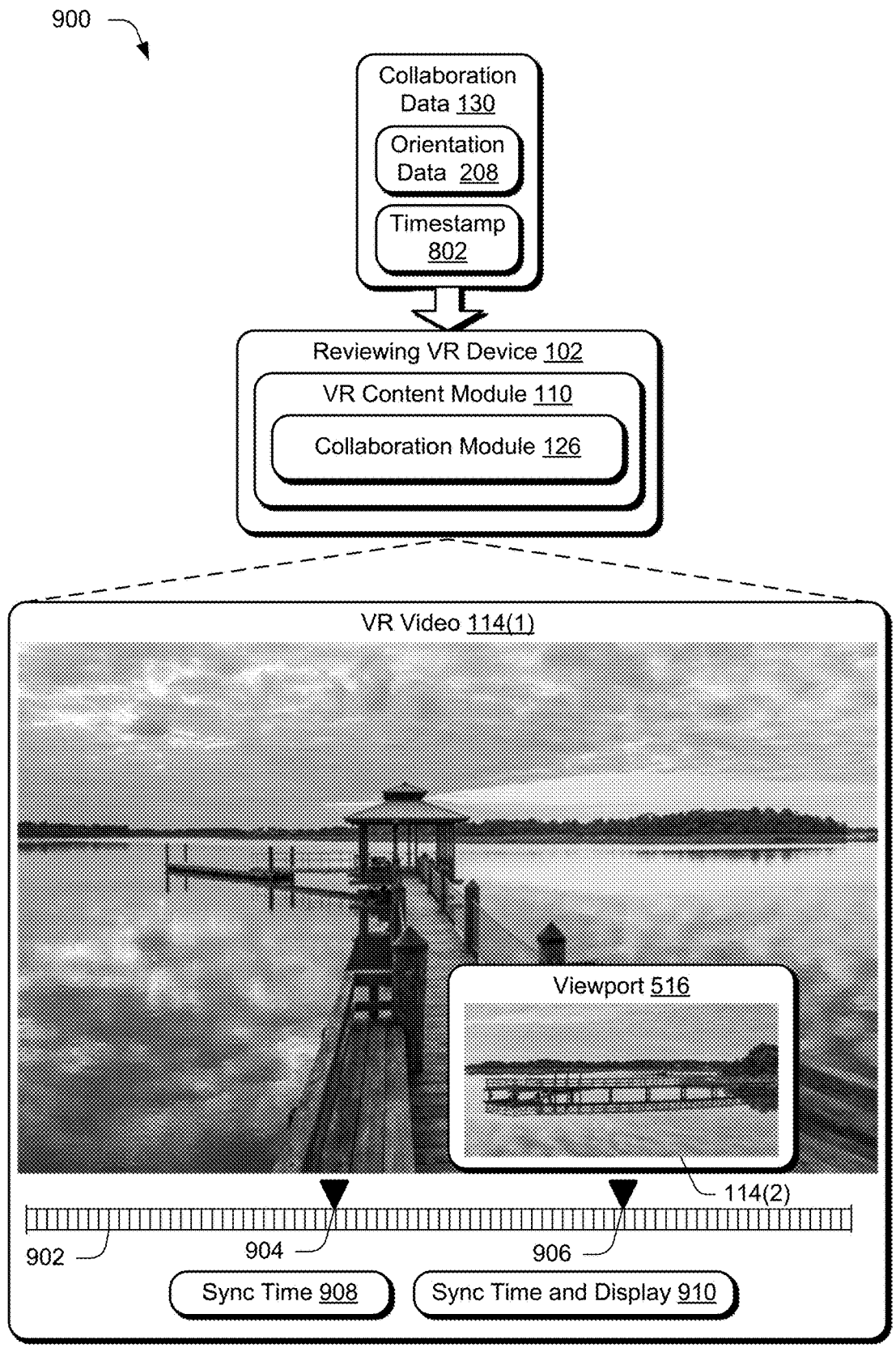
FIG. 9 depicts an example implementation in which the viewport is configured for display proximal to a timeline to indicate differences in temporal locations in the output of the VR video by the reviewing and source VR devices.

FIG. 9 depicts an example implementation 900 in which the viewport 516 is configured for display proximal to a timeline 902 to indicate differences in temporal locations in the output of the VR video 114 by the reviewing and source VR devices 102, 104. The collaboration module 126 also receives the collaboration data 130 that includes orientation data 208 and a timestamp 802. The collaboration module 126 then generates a viewport 516 as described in relation to FIG. 8 that includes thumbnails of VR video 114(2) output by the source VR device 104. Multiple viewports and thumbnails may be included in instances of multiple source VR devices 104.

In the illustrated example, a timeline 902 is displayed that is usable to navigate between different temporal locations (e.g., frames) within the VR video 114(1) by the reviewing VR device 102. The timeline 902 includes a user interface element 904 indicating a temporal location currently being output in the VR video 114(1).

The timeline 902 also includes a user interface element 906 of a temporal location, at which, the VR video 114(2) is output by the source VR device 104 based on the timestamp 802. In this way, the reviewing user 106 is readily made aware as to a temporal relationship of the reviewing and source VR devices 102, 104 in the output of the VR video 114. The user interface element 906 is also user selectable to cause output the viewport 516 as a thumbnail displayed proximal to the user interface element 906. The viewport 802, as described in relation to FIG. 8, includes a display of the VR video 114(2) as output by the source VR device 104. In another example, the viewport 802 is displayed as the user interface element 906 itself, i.e., is disposed itself at the temporal location in relation to the timeline 902. Thus, the viewport 516 in this example describes a temporal relationship of output by the VR video 114 by the reviewing and source VR devices 102, 104 to each other.

The viewport 516 in this example also includes options to synchronize output of the VR video 114 by the reviewing and source devices 102, 104. A "Sync Time" 908 option is selectable to synchronize the times in the output of the VR video 114 by the reviewing device 102 to the source device 104 based on the timestamp 802. As a result, the same frame of the VR video is output by both the reviewing and source VR devices 102, 104. Therefore, selection of this option supports synchronized times and asynchronous orientation with respect to the output of the VR video 114.

Another option is also user selectable to "Sync Time and Display" 910 in the output of the VR video 114. Selection of this option causes the collaboration module 126 to replace the output of the VR video 114(1) as controlled by the reviewing user 106 with the output of the VR video 114(2) as output by the source VR device 104 and controlled by the source VR device 104. As previously described, conventional techniques to do so caused nausea because movement within the output of the VR video 114 by the reviewing VR device 102 does not follow movement of the reviewing user's 106 head. Accordingly, anti-nausea portions may also be output in such an instance, examples of which are further described in the following section.

Anti-Nausea Portions in a Shared Display of VR Video

Figure 10:
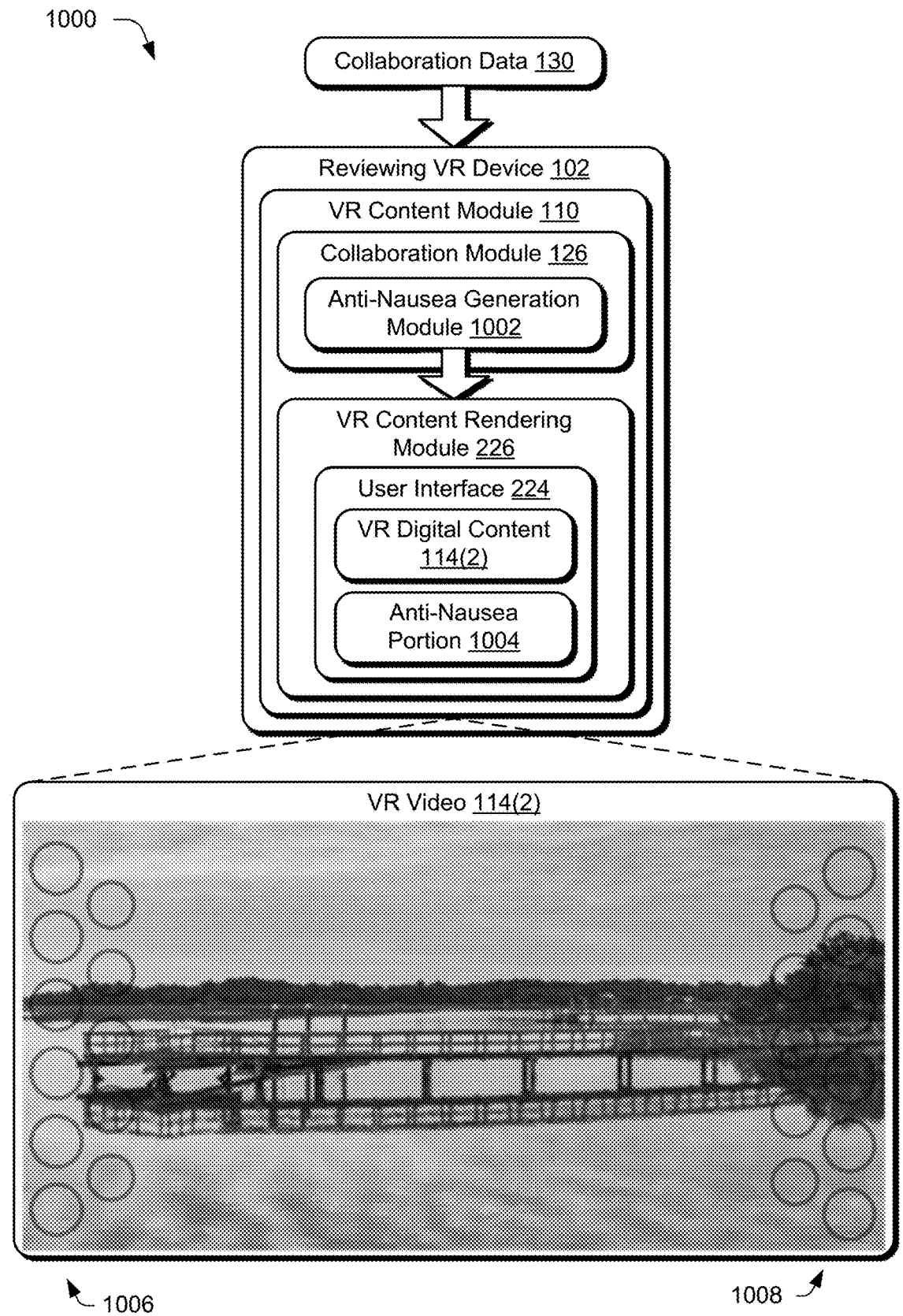
FIG. 10 depicts a system and FIG. 11 depicts a procedure in an example implementation in which an anti-nausea portion is generated to support collaboration between users with respect to VR video.
Figure 11:
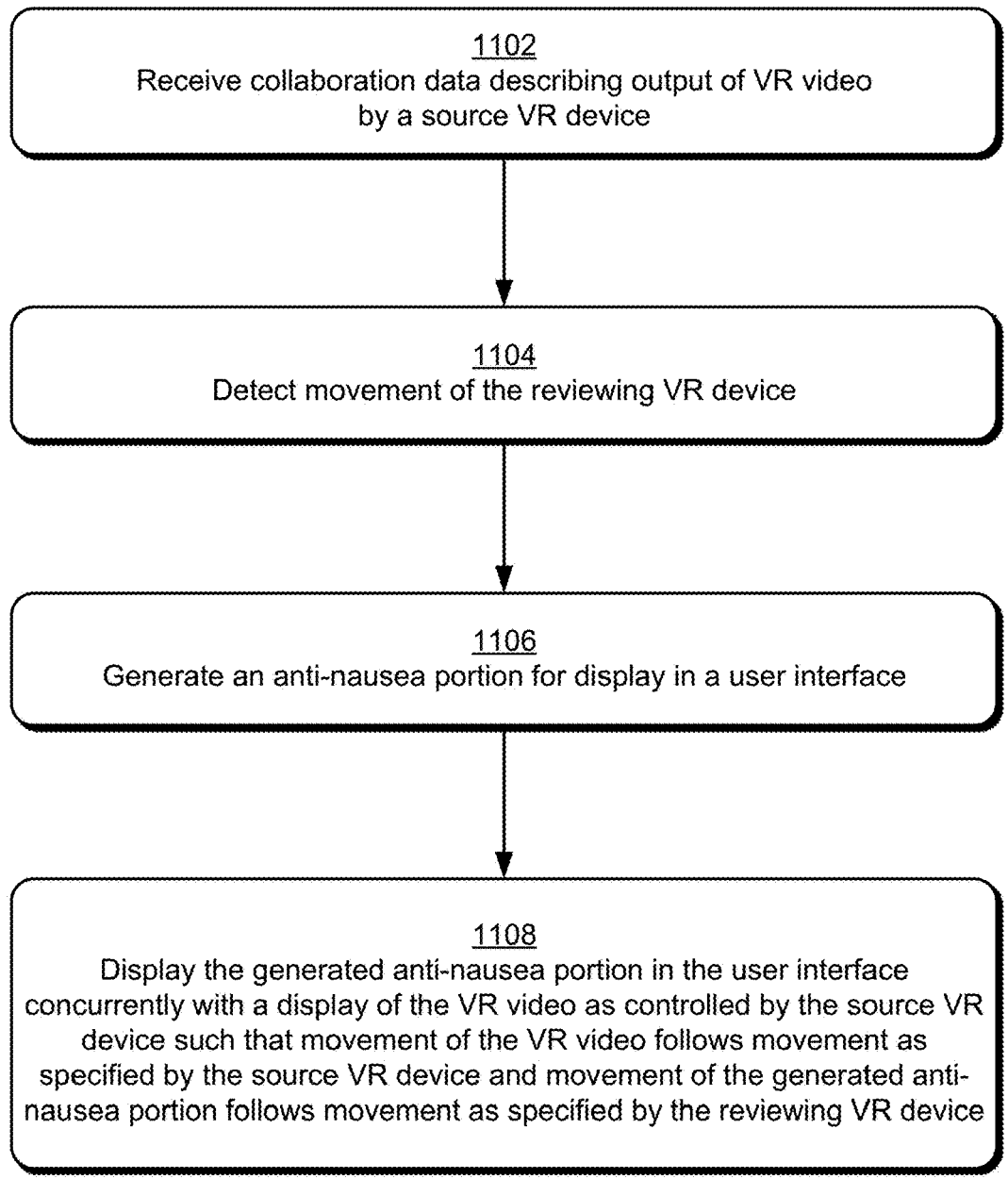

FIG. 10 depicts a system 1000 and FIG. 11 depicts a procedure 1100 in an example implementation in which an anti-nausea portion is generated to support collaboration between users with respect to VR video 114. As previously described in relation to FIGS. 6A-7D, VR video 114 may support an ability to look and navigate to different locations with a VR scene of the VR video 114. When done as part of collaboration between the reviewing and source users 106, 108, however, navigation controlled by the source user 108 may cause nausea to the reviewing user 106, especially when an entirety of a field-of-view of the reviewing VR device 102 is controlled by the source user 108. This is because movement that is being viewed by the reviewing user 106 is not being felt, e.g., by an inner ear, of the reviewing user 106. Further, movement of the reviewing user 106 may also run counter to movement of the source user 108 which may further exacerbate this problem, e.g., the reviewing and source users 106, 108 may move in different directions.

Accordingly, in this example the collaboration module 126 includes an anti-nausea generation module 1002 that is configured to generate an anti-nausea portion 1004 for concurrent display with an output of VR video 114(2) controlled by another user. The reviewing VR device 102, for instance, is illustrated as receiving collaboration data 130 that describes an orientation within an output of VR video 114(2) as previously described. This orientation is used to control output of the VR video 114(2). Thus, the reviewing user 106 views the VR video 114(2) viewed by the source user 108 via the source VR device 104.

Movement of the reviewing VR device is detected (block 1704) by the anti-nausea generation module 1002, e.g., through a user input device. This may include movement of a user's head (e.g., through gyroscopes, inertia sensors) or other navigation input as previously described in relation to FIG. 3. In response, an anti-nausea portion 1004 is generated for display in a user interface (block 1706). The generated anti-nausea portion 1004 is displayed in the user interface concurrently with a display of the virtual reality video 114(2) as controlled by the source VR device 104. Therefore, movement of the virtual reality video 114(2) follows movement as specified by the source VR device 104.

However, movement of the generated anti-nausea portion 1004 follows movement as specified by the reviewing VR device 102 (block 1708). This may be accomplished in a variety of ways. In the illustrated example, the anti-nausea portion 1004 is displayed at peripheral portions 1006, 1008 of a user interface along with the portion of the VR video 114(2). The anti-nausea portions 1004 are circular in this example and semi-translucent such that a portion of the VR video 114(2) is viewable "through" these portions and thus limit interference with the display of the VR video 114(2).

The anti-nausea portions 1004 are configured to respond to movement as defined by the reviewing VR device 102 but not the source VR device 104. This may include generation of the anti-nausea portions 1004 to appear to scroll within the peripheral portions 1006, 1008 in response to movement of the reviewing user 106 such that these portions appear stationary with respect to a user's surroundings, e.g., user head movement that is up and down or left to right. This provides feedback to the user that responds to this movement and thus lowers a likelihood of the reviewing user 106 experiencing nausea, even when control of a field-of-view of the reviewing VR device 102 to display the VR video 114(2) is performed by the source VR device 104. As a result, collaboration between VR devices may be performed to support full immersion, which is not possible using conventional techniques that lack such feedback.

Collaboration Data and Annotations

In the previous sections, collaboration data 130 is configured to support collaboration by indicating a portion of VR video 114 output by a source VR device 104 to a reviewing VR device. In this section, annotations are described that are leveraged as part of the collaboration data 130 to support communication of the reviewing and source users 106, 108 of the reviewing and source VR devices 102, 104 with each other at these respective times and orientations in the output of the VR video 114. In this way, communication of the collaboration data 130, and not the streaming of the VR video 114 itself, may support real time interaction between the devices through efficient use of network and computational resources. The collaboration data 130, for instance, may be used to generate annotations by the reviewing VR device in output in conjunction with a locally stored version of the VR video. Thus, the amount of collaboration data 130 that is communicated between the devices is significantly less than streaming the VR video having the annotations included as part of the video.

Figure 12:
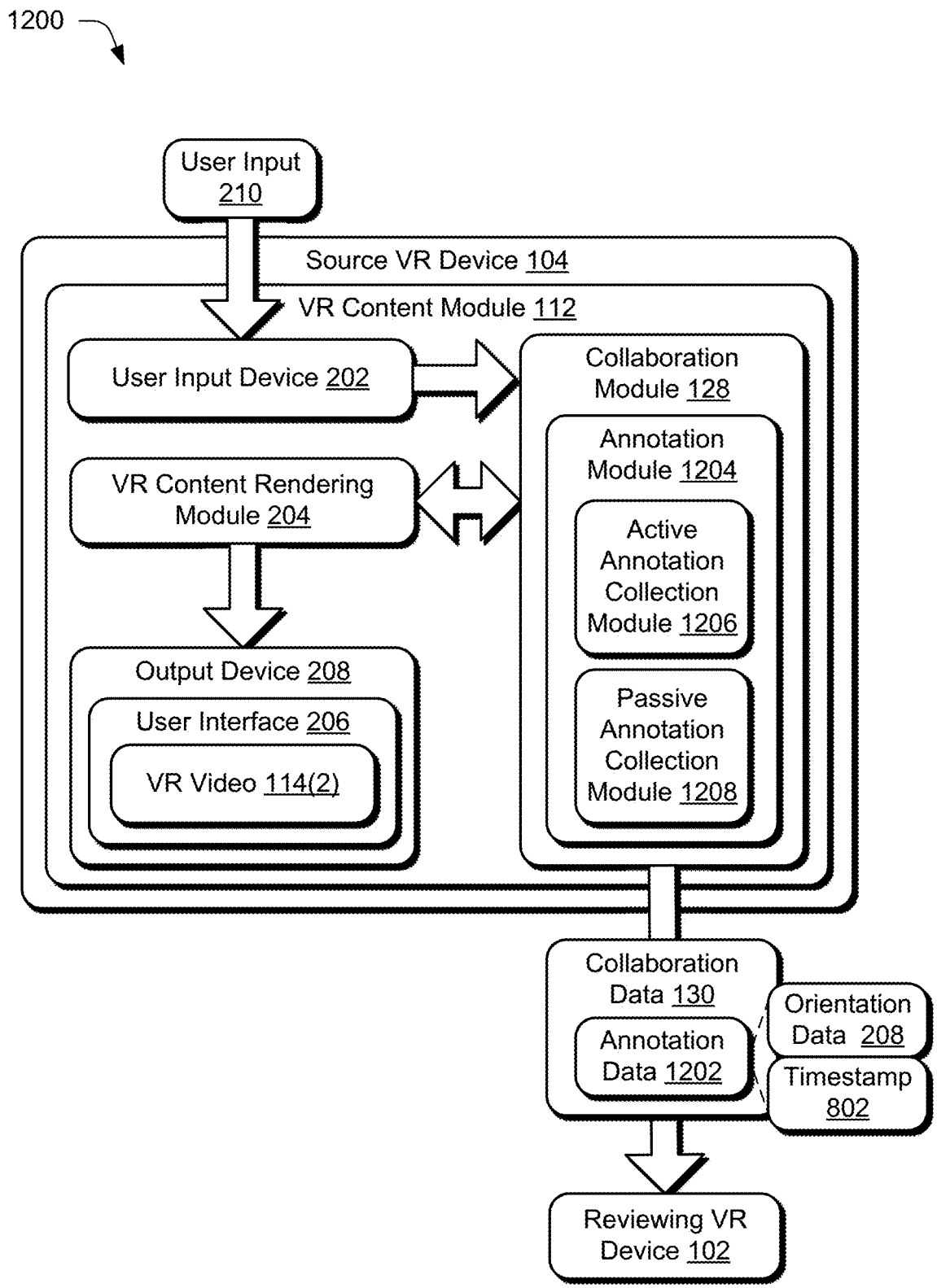
FIG. 12 depicts an example implementation in which the collaboration module is further configured to collect annotation data through use of an annotation module.

FIG. 12 depicts an example implementation 1200 in which the collaboration module 128 is further configured to collect annotation data 1202 through use of an annotation module 1204. In the previous examples, the collaboration data 130 describes an orientation and/or time (e.g., timestamp) with respect to an output of the VR video 114(2) through orientation data 208 and a timestamp 802, respectively. In this example, annotation data 1202 is also collected by the annotation module 1204 to describe the source user's 108 thoughts and interactions with respect to those orientations and times within the output of the VR video 114(2). The annotation data 1202 is then used by the reviewing VR device 102 to generate an annotation for output in conjunction with the VR video 114(1).

Examples of types of annotations collectable by the annotation module 1204 include active annotations collectable by the active annotation module 1206 and passive annotations collectable by the passive annotation module 1208. Passive annotations are annotations observed by the passive annotation module 1208 that are not actively user initiated. The passive annotation module 1208, for instance, may employ the user input device 202 as a microphone to generate data automatically and without user intervention that describes likes or dislikes based on sounds made by the source user 108, e.g., clapping, sighs, laughing, and so forth.

In another instance, the user input device 202 is configured to capture facial expressions of the source user 108, and from this, generate annotation data 1204 describing likes and dislikes. In this way, the annotation data 1204 may expand a range of description of user interaction as part of the collaboration data 130. The annotation data 1202 is then associated with the orientation data 208 and/or timestamp 802 for generating an annotation as further described in relation to FIG. 13.

Active annotations, on the other hand are annotations that are actively initiated by the source user 108 via user inputs 210 received by the user input device 202. The source user 108, for instance, may initiate generation of an annotation as a voice clip, freeform drawing, user ranking (e.g., selection of a "thumbs up" or "thumbs down") and so forth. Thus, active annotations involves active participation by the source user 108 in providing the annotation defined by the annotation data 1202.

The source VR device 104, for instance, may output VR video 114(2) for viewing by the source user 108 as previously described. A user input is received by the source VR device 104 via the user input device 202 from the source user 108 to input an annotation. The source user 108, for instance, may select an option in the user interface 206 to provide an annotation.

In response, the source VR device 104 pauses an output of the VR video 114(2) in this instance. A user input 210 is also received by the source VR device specifying an annotation, e.g., a freeform or other series of lines defining a portion of the VR video 114(2), a spoken utterance, gesture, and so forth. The user input 210 in this example is associated by the active annotation module 120 as annotation data 1202 in conjunction with a timestamp 802 corresponding to a frame being paused in the VR video 114(2). The annotation data 1202 is also associated with orientation data 208 describing an orientation of the annotation with respect to the output of the VR video 114(2), e.g., as coordinates as described in relation to FIG. 3.

Collaboration data 130 that includes the annotation data 1202, timestamp 802, and orientation data 208 is then transmitted by the source VR device 104 to the reviewing VR device 102. Thus, like before, the collaboration data 130 may promote network and computational efficiency rather than communication of the VR video, itself. This collaboration data is then used by the reviewing VR device 102 to control output of the annotation as further described below.

Figure 13:
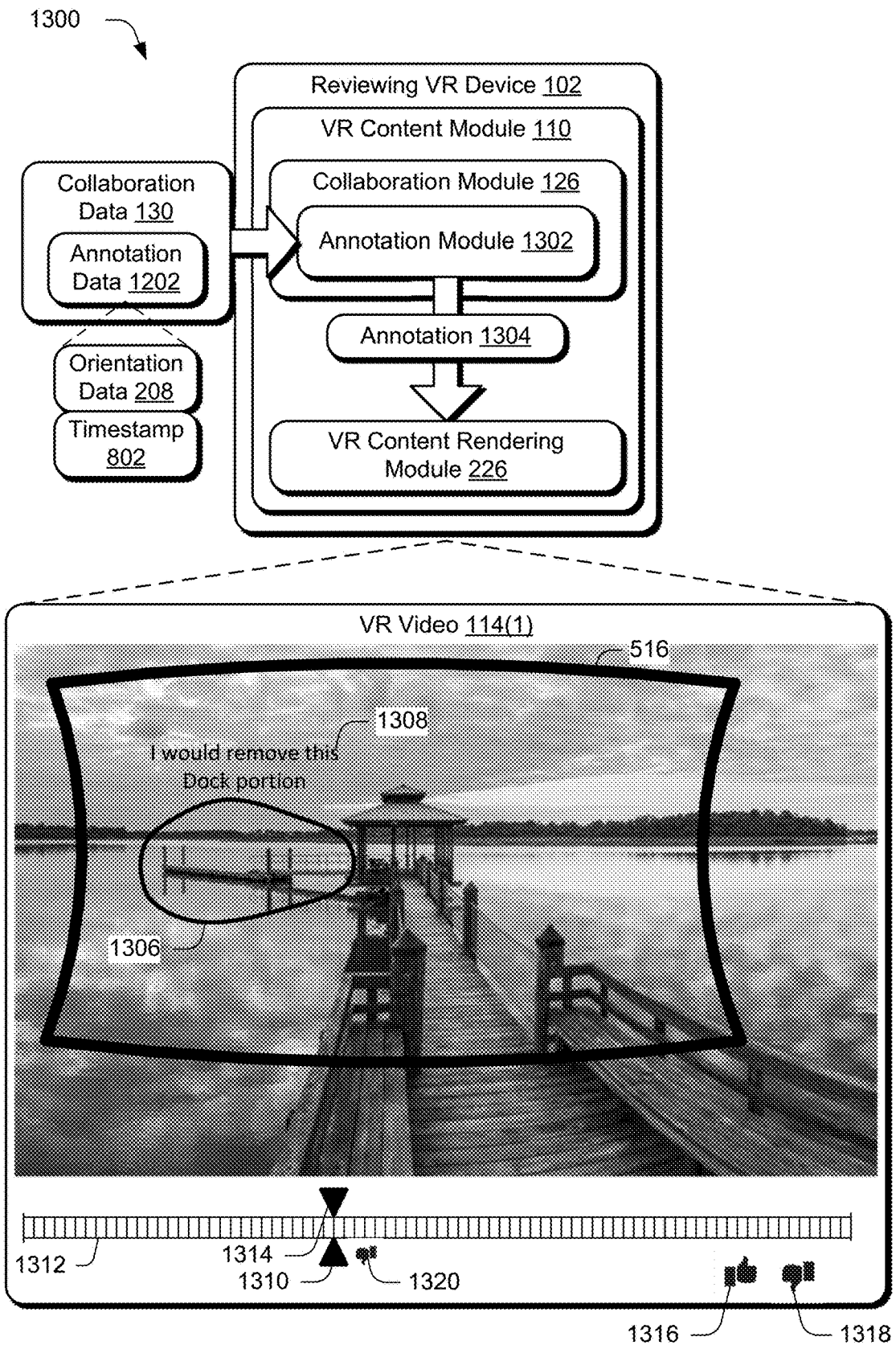
FIG. 13 depicts an example implementation of output of VR video by the reviewing VR device that includes an annotation.

FIG. 13 depicts an example implementation 1300 of output of VR video 114(1) by the reviewing VR device 102 that includes an annotation 1304. The reviewing VR device 102 as before includes a VR content module 110 having a collaboration module 126 and a VR content rendering module 226. An annotation module 1302 is configured in this instance to generate a user interface element 222 that includes the annotation 1304 for viewing as part to the VR video 114(1).

As previously described, the annotation 1306 is associated with an orientation and time as defined by the orientation data 208 and timestamp 802, respectively as part of the collaboration data 130. Accordingly, the annotation 1306 may be configured as corresponding to a particular portion of the VR video 114(1) that corresponds to the orientation data 208 and time (e.g., frame) that corresponds to the timestamp 802 with respect to an output of the VR video 114(1), e.g., the freeform line 1306 and text 1308.

The annotation 1304 may also specify a temporal location within an output of the VR video 114(1) via a respective user interface element 1310. The user interface element 1310 of the annotation 1304, for instance, may correspond to a frame as part of a timeline 1312 used to navigate to different temporal locations within an output of the VR video 114(1), e.g., different frames. Accordingly, the user interface element 1310 may indicate "where to look" temporally in an output of the VR video 114(1), e.g., for the freeform line 1306 or text 1308. In this way, the collaboration module 126 may support efficient navigation and output of the annotation 1306 as part of collaboration using the VR video 114.

The reviewing VR device 104, for instance, may display the user interface element 1310 with respect to the timeline 1312 indicating that an annotation 1304 is associated with a respective timestamp 802. Selection of the user interface element 1310 may then cause output of the annotation 1304 at the respective time (e.g., frame) in the output of the VR video 114(1) based on the timestamp 802 and respective portion in that frame of the VR based on the orientation data 208. In this way, the reviewing user 106 may efficiently and accurately view the annotation 1304 and thus collaborate with the source user 108 between the reviewing and source VR devices 102, 104.

The annotation 1304 may also be output automatically and without user intervention by the reviewing VR device 102. The reviewing VR device 102, for instance, may output the VR video 114(1) as normal in which navigation within the VR video 114(1) is controlled by the reviewing VR device 102, e.g., through movement of the reviewing user's 106 head. The collaboration data 130 may then be used to output a viewport 516 as described above based on the orientation data 208 as well as the timestamp 802.

The viewport 516, for instance, may be output over a plurality of frames of the VR video 114(1) based on the timestamp 802 such that the reviewing user 106 is able to view the viewport 516 without pausing output of the VR video 114(1). The annotation 1304 (e.g., freeform line 1306, text 1308, spoken utterance, etc.) is displayed within this viewport 516, e.g., over the plurality of frames. This may be performed to mimic how the source user 108 input the annotation data 1202 (e.g., to mimic the drawing of the freeform line over a series of frames) or show a completed version of the annotation as copied over successive frames in the output of the VR video. In this way, the annotation 1304 is output with respect to the VR video 114(1) in a manner that is intuitive, may be located through user interface elements described above, and reduces a likelihood of nausea of conventional techniques and systems.

Additional examples of annotations include an ability to select options to "like" 1316 or "dislike" 1318 a corresponding portion of the VR video 114(1). This causes the annotation 1320 to be associated at the corresponding timestamp 802 and orientation data 208 for viewing with respect to the timeline 1312. A variety of other examples, including audio notes and corresponding indication of availability of the audio note as an annotation with respect to the timeline 1312 are also contemplated. In this way, the annotations support visualization of activities performed by the source user 108 to the reviewing user 106 within a context of the VR video 114.

Non-Modal Collaboration

Figure 14:
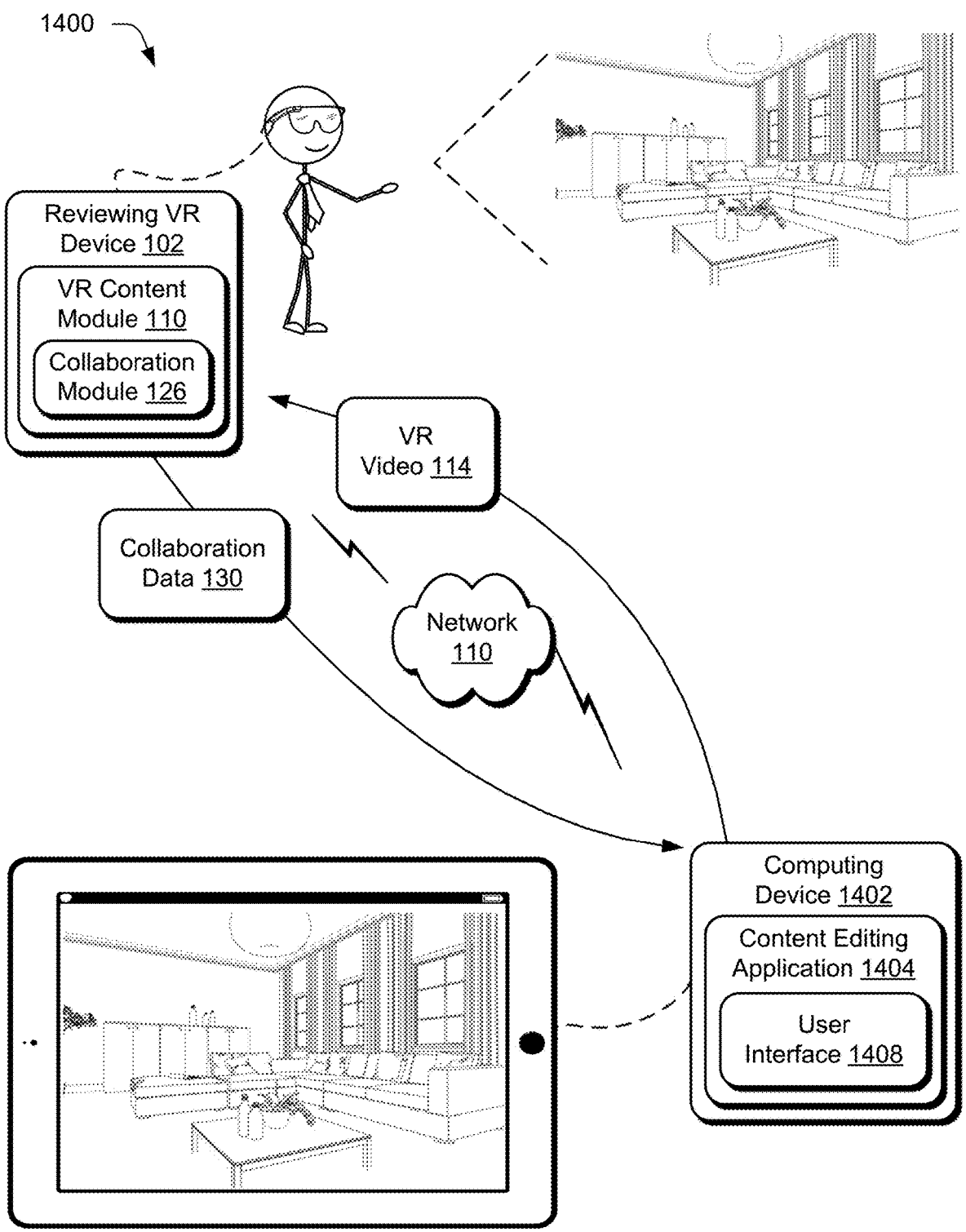
FIG. 14 depicts an example system of collaboration in which VR video is shared over a local area network and collaboration data is received involving interaction with the content, e.g., a review.
Figure 15:
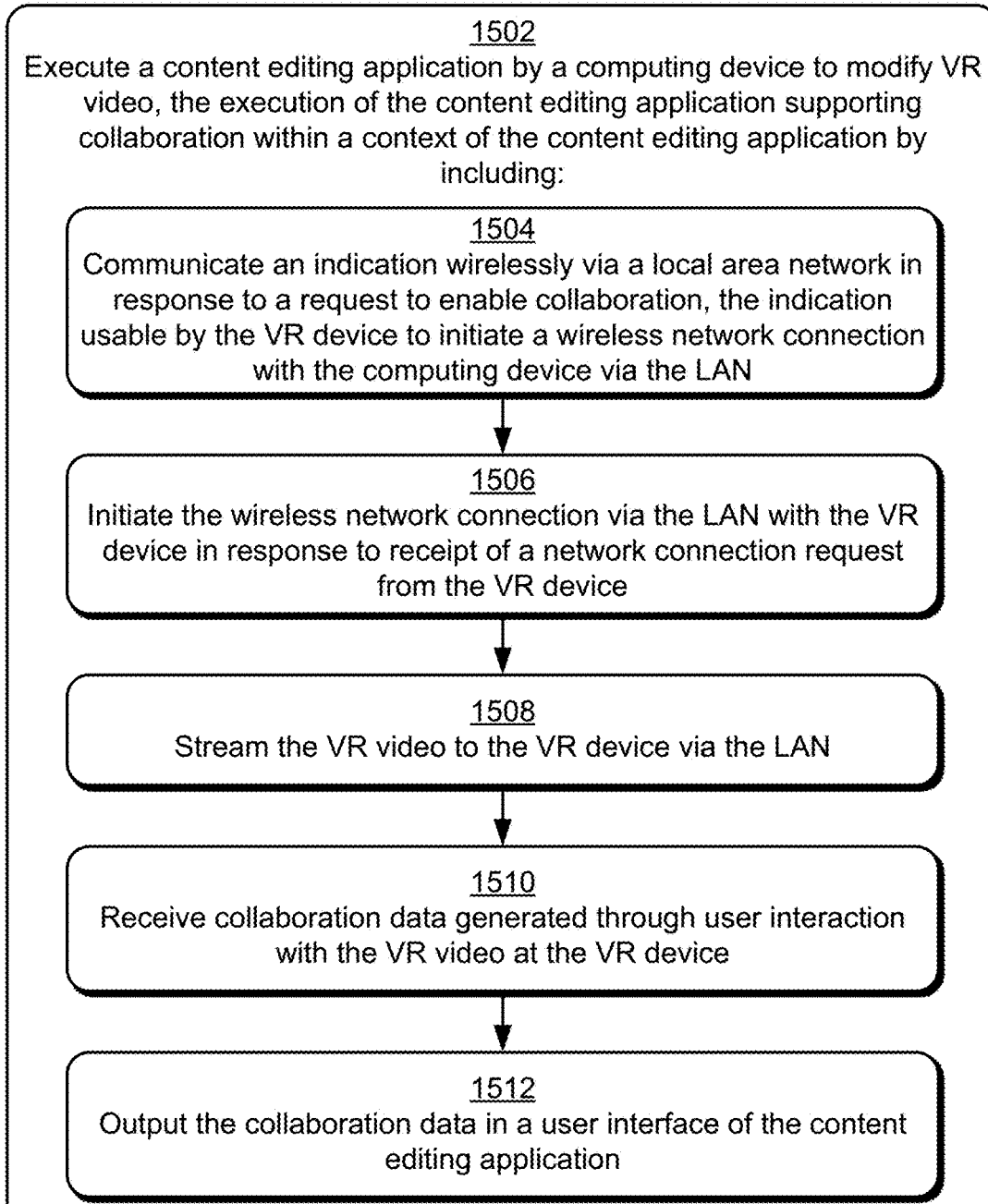
FIG. 15 depicts a procedure in an example implementation in which collaboration over a wireless network connection is performed within a context of execution of a content editing application by a computing device.

FIG. 14 depicts an example system 1400 of collaboration in which VR video is shared over a local area network and collaboration data is received involving interaction with the content, e.g., a review. FIG. 15 depicts a procedure 1500 in an example implementation in which collaboration over a wireless network connection is performed within a context of execution of a content editing application by a computing device.

In this section, techniques and systems are described to support efficient distribution of VR video as part of collaboration within a context of a content editing application. In this way, VR video may be shared and comments may be received via collaboration data that result from this sharing without requiring a user to navigate "outside" of a context of a user interface of the content editing application, and thus is considered "non-modal." In this way, the content editing application supports increased user efficiency and also improves computational resource efficiency as further described in the following.

As illustrated, the reviewing VR device 102 includes a VR content module 110 and collaboration module 126 as described above. The collaboration module 126 is configured to generate collaboration data 130 for sharing with a computing device 802. The computing device 802 in this example includes a content editing application 804 that is executable by a processing system and storable in a computer-readable storage media to modify VR video 114, e.g., create, edit, modify, store, and/or output the content.

To begin, a content editing application 1404 is executed by a computing device 1402 to modify VR video (block 1502). The execution of the content editing application 1404 also supports non-modal collaboration within a context of the application. A video producer, for instance, may interact with a user interface 1408 of the content editing application 1404 to create the VR video 114 and wish to get the thoughts of a couple of reviewers. Conventional techniques to do so involved posting the VR video to a website (e.g., YouTube® or Facebook®), "side loading" the video locally to the VR device and then accessing a media player to view the video, and so on. Thus, each of these conventional techniques are modal in that a reviewer is forced to navigate "outside" of a user interface of the content editing application to share the video and receive comments that result from a review of the video.

Accordingly, non-modal techniques are implemented by the content editing application 1404 that support sharing and review of VR video 114 within a context of the content editing application 214. To do so, the video producer selects an option as part of the content editing application to make the VR video 114 available for sharing. The sharing, for instance, may be performed using a wireless local area network, such as a network configured in accordance with one or more wireless standards (e.g., Wi-Fi such as IEEE 802.11), Bluetooth®, and so forth as a local area network (LAN).

In response, the content editing application 1404 is executed by the computing device 1402 to communicate a user interface element (e.g., beacon data) wirelessly that indicates availability of the VR video 114 (block 1504). A reviewer, through interaction with the collaboration module 126 at the respective reviewing VR device 102, for instance, views the user interface element in a user interface, e.g., "video producer wants you to review a VR film." In response, the reviewer provides a user input via interaction with a user interface of the collaboration module 126 to request a direct wireless connection with the computing device 1402 of the video producer, e.g., via Wi-Fi, Bluetooth®, and so forth via a local area network (LAN). The user interface element may be broadcast as available for any local VR devices or communicated to VR devices identified by the video producer.

The request may then be output in a user interface 1408 for the video producer to verify access before initiating the wireless network connection and/or may be initiated automatically and without user intervention by the content editing application 1404. Thus, at this point the wireless network connection between the computing device 1402 and the reviewing VR device 102 is initiated in response to receipt of the network connection request (block 1506).

Once the wireless network connection is initiated, the VR video is streamed to the reviewing VR device 102 via the LAN (block 1508). In this way, memory and network resources of the reviewing VR device 102 may be conserved as opposed to techniques that require downloading of an entirety of the content, although that technique may also be performed without departing from the spirit and scope of the techniques described herein.

The reviewer then interacts with the VR video 114 via respective VR device 102. Collaboration data 130 is generated by the collaboration module 126 and communicated back to the computing device 802 via the network 132. The collaboration data 130 may take a variety of forms. The collaboration data 130, for instance, may include annotations as described above, a "thumbs up" or "thumbs down" that is associated with respective times or locations within the VR video, passive feedback, and so on.

Thus, the computing device 1402 of the video producer then receives the collaboration data (block 1510) and outputs the collaboration data in the user interface 1410 of the content editing application 1402 (block 1512). The user interface, 1408 for instance, may configure the collaboration data 130 to display changes, suggestions, annotations, and so forth simultaneously in conjunction with the VR video 114 in the user interface 1410. In this way, the video producer may remain within a context of the content editing application 804 and share and receive comments in a non-modal manner from other VR devices, e.g., VR device 102.

Example System and Device

Figure 16:
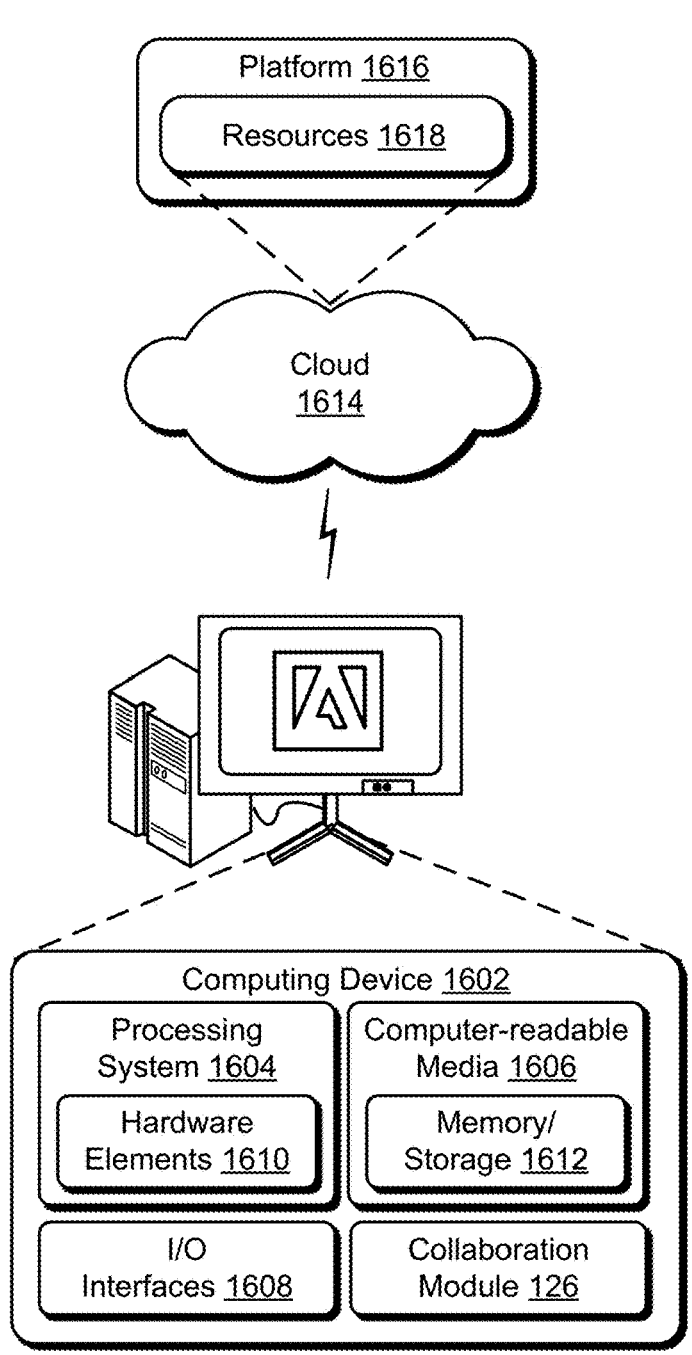
FIG. 16 illustrates an example system including various components of an example device that can be implemented as any type of computing device as described and/or utilize with reference to FIGS. 1-15 to implement implementations of the techniques described herein.

FIG. 16 illustrates an example system generally at 1600 that includes an example computing device 1602 that is representative of one or more computing systems and/or devices that may implement the various techniques described herein. This is illustrated through inclusion of the collaboration module 126. The computing device 1602 may be, for example, a server of a service provider, a device associated with a client (e.g., a client device), an on-chip system, and/or any other suitable computing device or computing system.

The example computing device 1602 as illustrated includes a processing system 1604, one or more computer-readable media 1606, and one or more I/O interface 1608 that are communicatively coupled, one to another. Although not shown, the computing device 1602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1604 is representative of functionality to perform one or more operations using hardware. Accordingly, the processing system 1604 is illustrated as including hardware element 1610 that may be configured as processors, functional blocks, and so forth. This may include implementation in hardware as an application specific integrated circuit or other logic device formed using one or more semiconductors. The hardware elements 1610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1606 is illustrated as including memory/storage 1612. The memory/storage 1612 represents memory/storage capacity associated with one or more computer-readable media. The memory/storage component 1612 may include volatile media (such as random access memory (RAM)) and/or nonvolatile media (such as read only memory (ROM), Flash memory, optical disks, magnetic disks, and so forth). The memory/storage component 1612 may include fixed media (e.g., RAM, ROM, a fixed hard drive, and so on) as well as removable media (e.g., Flash memory, a removable hard drive, an optical disc, and so forth). The computer-readable media 1606 may be configured in a variety of other ways as further described below.

Input/output interface(s) 1608 are representative of functionality to allow a user to enter commands and information to computing device 1602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1602. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1610 and computer-readable media 1606 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1610. The computing device 1602 may be configured to implement particular instructions and/or functions corresponding to the software and/or hardware modules. Accordingly, implementation of a module that is executable by the computing device 1602 as software may be achieved at least partially in hardware, e.g., through use of computer-readable storage media and/or hardware elements 1610 of the processing system 1604. The instructions and/or functions may be executable/operable by one or more articles of manufacture (for example, one or more computing devices 1602 and/or processing systems 1604) to implement techniques, modules, and examples described herein.

The techniques described herein may be supported by various configurations of the computing device 1602 and are not limited to the specific examples of the techniques described herein. This functionality may also be implemented all or in part through use of a distributed system, such as over a "cloud" 1614 via a platform 1616 as described below.

The cloud 1614 includes and/or is representative of a platform 1616 for resources 1618. The platform 1616 abstracts underlying functionality of hardware (e.g., servers) and software resources of the cloud 1614. The resources 1618 may include applications and/or data that can be utilized while computer processing is executed on servers that are remote from the computing device 1602. Resources 1618 can also include services provided over the Internet and/or through a subscriber network, such as a cellular or Wi-Fi network.

The platform 1616 may abstract resources and functions to connect the computing device 1602 with other computing devices. The platform 1616 may also serve to abstract scaling of resources to provide a corresponding level of scale to encountered demand for the resources 1618 that are implemented via the platform 1616. Accordingly, in an interconnected device embodiment, implementation of functionality described herein may be distributed throughout the system 1600. For example, the functionality may be implemented in part on the computing device 1602 as well as via the platform 1616 that abstracts the functionality of the cloud 1614.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to output virtual-reality video, a method implemented by a reviewing virtual reality (VR) device, the method comprising:
   receiving, by the reviewing VR device, orientation data describing an orientation with respect to output of virtual reality video by a source VR device;
   comparing, by the reviewing VR device, the orientation with coordinates of a coordinate system of the virtual reality video;
   determining, by the reviewing VR device, a portion of a frame of the virtual reality video rendered in a source user interface of the source VR device based on the comparing;
   generating, by the reviewing VR device, an anti-nausea portion for display in a user interface of the reviewing VR device;
   displaying, by the reviewing VR device, the anti-nausea portion in the user interface concurrently with the virtual reality video, the virtual reality video is configured to move in the user interface by the orientation data based on the portion of the frame rendered in the source user interface, the anti-nausea portion is controlled to move in the user interface by the reviewing VR device and the anti-nausea portion is displayed as stationary with respect to a physical environment of the reviewing VR device.

2. The method as described in claim 1, wherein the anti-nausea portion is displayed over the virtual reality video in the user interface.

3. The method as described in claim 1, wherein the anti-nausea portion is at least partially translucent and the portion of the frame of the virtual reality video is viewable through the anti-nausea portion.

4. The method as described in claim 1, further comprising detecting movement of the reviewing VR device and wherein the anti-nausea portion moves based on the movement of the reviewing VR device.

5. The method as described in claim 1, wherein the virtual reality video is synchronized with output of the virtual reality video by the source VR device.

6. The method as described in claim 1, wherein the reviewing VR device does not control output of the virtual reality video.

7. The method as described in claim 1, wherein the anti-nausea portion is a viewport.

8. The method as described in claim 7, wherein the viewport defines the portion of the frame of the virtual reality video.

9. The method as described in claim 7, wherein the viewport is configured as a border at least partially surrounding a portion of the virtual reality video displayed in the user interface.

10. In a digital medium environment to output virtual-reality video, a virtual reality (VR) device comprising:
    an output device;
    orientation tracking sensors to output tracking data to track orientation of the VR device;
    a processing system; and
    a computer-readable storage medium having instructions stored thereon that, responsive to execution by the processing system, causes the processing system to perform operations comprising:
    receiving orientation data describing an orientation with respect to output of virtual reality video by a source VR device;
    comparing the orientation with coordinates of a coordinate system of the virtual reality video;
    determining a portion of a frame of the virtual reality video rendered in a source user interface of the source VR device;
    generating an anti-nausea portion for display in a user interface of the VR device; and
    displaying, by the output device, the anti-nausea portion in the user interface at peripheral portions of the user interface concurrently with the virtual reality video, the virtual reality video is configured to move in the user interface by the orientation data based on the portion of the frame rendered in the source user interface, the anti-nausea portion is controlled to move within the peripheral portions of the user interface by the VR device and the anti-nausea portion is displayed as stationary with respect to a physical environment of the VR device.

11. The VR device as described in claim 10, wherein the anti-nausea portion is displayed over the virtual reality video in the user interface.

12. The VR device as described in claim 10, wherein the anti-nausea portion is at least partially translucent and the portion of the frame of the virtual reality video is viewable through the anti-nausea portion.

13. The VR device as described in claim 10, further comprising detecting movement using the orientation tracking sensors and wherein the anti-nausea portion moves based on the movement.

14. The VR device as described in claim 10, wherein the virtual reality video is synchronized with output of the virtual reality video by the source VR device.

15. The VR device as described in claim 10, wherein the orientation of the VR device does not control output of the virtual reality video by the source VR device.

16. The VR device as described in claim 10, wherein the anti-nausea portion is a viewport.

17. The VR device as described in claim 16, wherein the viewport defines the portion of the frame of the virtual reality video.

18. One or more non-transitory computer-readable storage media comprising instructions stored thereon that, responsive to execution by a computing device cause the computing device to perform operations including:
- receiving orientation data describing an orientation with respect to output of virtual reality video by a source virtual reality (VR) device;
- comparing the orientation with coordinates of a coordination system of the virtual reality video;
- generating an anti-nausea portion for display in a user interface based on the orientation data; and
- displaying the anti-nausea portion as a viewport in the user interface concurrently with the virtual reality video, the viewport indicating a portion of the virtual reality video output by the source VR device based on the comparing, the virtual reality video is configured to move in the user interface by the orientation data, the anti-nausea portion is controlled to move in the user interface by the computing device and the anti-nausea portion is displayed as stationary with respect to a physical environment of the computing device.

19. The one or more non-transitory computer-readable storage media as described in claim 18, wherein the anti-nausea portion is at least partially translucent and the portion of the virtual reality video is viewable through the anti-nausea portion.

20. The one or more non-transitory computer-readable storage media as described in claim 18, wherein the viewport is configured as a border at least partially surrounding the portion of the virtual reality video displayed in the user interface.

* * * * *

UNITED STATES PATENT AND TRADEMARK OFFICE
CERTIFICATE OF CORRECTION

PATENT NO. : 10,803,642 B2  
APPLICATION NO. : 15/680523  
DATED : October 13, 2020  
INVENTOR(S) : Stephen Joseph DiVerdi, Aaron Phillip Hertzmann and Brian David Williams Page 1 of 1

It is certified that error appears in the above-identified patent and that said Letters Patent is hereby corrected as shown below:

On the Title Page

Item (72) Insert inventor -- Cuong D. Nguyen, San Francisco, CA --, therefor.

Signed and Sealed this  
Sixteenth Day of March, 2021

Drew Hirshfeld  
*Performing the Functions and Duties of the*  
*Under Secretary of Commerce for Intellectual Property and*  
*Director of the United States Patent and Trademark Office*